US012430844B2

United States Patent
Krishnan et al.

(10) Patent No.: US 12,430,844 B2
(45) Date of Patent: Sep. 30, 2025

(54) CONFIGURABLE VIRTUAL ENVIRONMENT DEFINITIONS

(71) Applicant: SAP SE, Walldorf (DE)

(72) Inventors: Kavitha Krishnan, Bangalore (IN);
Rohit Jalagadugula, Visakhapatnam (IN); Gopi Kishan, Raxaul (IN);
Prateek Garg, Bangalore (IN);
Maheswar Reddy Pulla, Bangalore (IN); Manoj Kumar, Bangalore (IN);
Diwakar Maurya, Bangalore (IN);
Shweta Mohanty, Bangalore (IN);
Sindhu Gangadharan, Bangalore (IN);
Jayananda A Kotri, Bangalore (IN);
Kalpana Karunamurthi, Bangalore (IN); Amey Haram, Bangalore (IN)

(73) Assignee: SAP SE, Walldorf (DE)

( * ) Notice: Subject to any disclaimer, the term of this patent is extended or adjusted under 35 U.S.C. 154(b) by 177 days.

(21) Appl. No.: 18/217,748

(22) Filed: Jul. 3, 2023

(65) Prior Publication Data

US 2024/0386658 A1    Nov. 21, 2024

(30) Foreign Application Priority Data

May 15, 2023   (IN) .............................. 202311034004

(51) Int. Cl.
| | |
|---|---|
| *G06T 17/00* | (2006.01) |
| *G06F 3/04815* | (2022.01) |
| *G06F 3/0482* | (2013.01) |
| *G06T 13/40* | (2011.01) |

(52) U.S. Cl.
CPC .......... *G06T 17/00* (2013.01); *G06F 3/04815* (2013.01); *G06F 3/0482* (2013.01); *G06T 13/40* (2013.01)

(58) Field of Classification Search
None
See application file for complete search history.

(56) References Cited

U.S. PATENT DOCUMENTS

| | | | | |
|---|---|---|---|---|
| 2012/0330785 A1* | 12/2012 | Hamick | ................ | G06Q 30/06 |
| | | | | 705/26.41 |
| 2013/0300762 A1* | 11/2013 | Dawson | ................ | A63F 13/52 |
| | | | | 345/619 |
| 2014/0137229 A1* | 5/2014 | Dawson | ................ | H04L 63/00 |
| | | | | 726/11 |

* cited by examiner

Primary Examiner — Yingchun He
(74) Attorney, Agent, or Firm — Klarquist Sparkman, LLP

(57) ABSTRACT

Techniques and solutions are provided for facilitating the definition and use of virtual environments. Typically, virtual environments require manual linking of virtual environment components, such as locations, avatars to be displayed, avatar interactions, and actions to be taken upon a selected interaction. This is in addition to actions to define, for example, a visual representation of a virtual location or an avatar. Disclosed techniques provide standardized data objects that can represent components of a virtual environment and relationships between such components. For example, aspects of a virtual environment can be predefined, and a user can configure the virtual environment with particular avatars and particular avatar content (such as media to be rendered for that avatar). In particular aspects, components of a virtual environment, such as avatars, can be determined at runtime, included based on attributes associated with a particular user for whom the virtual environment is to be rendered.

20 Claims, 15 Drawing Sheets

FIG. 7

My Profile   My Spaces

Basic Data

First Name: Rohit
Last Name: J
Designation: Engineering Intern
Location: Boston (1921 – 1022)
Department: Engineering US (20110075)

About Me: Hello, I am Rohit. I work as a full stack developer at SAP Boston. I am passionate about system design and architecture. My hobbies include playing games. I look forwarding to working with you!

Save
Preview

Avatar Data

Create New Avatar

Make Default | Show | Delete
Make Default | Show | Delete

Avatar Animations

▶ Idle
▶ Quick Formal Bow
▶ Shaking Hands
▶ Talking
▶ Walking

CONFIGURABLE VIRTUAL ENVIRONMENT DEFINITIONS

CROSS-REFERENCE TO RELATED APPLICATIONS

This application claims priority under 35 U.S.C. § 119 (a) to Indian Provisional Patent Application No. 20/2311034004, filed on May 15, 2023, the entire contents of which are incorporated herein by reference.

FIELD

The present disclosure generally relates to generating and using virtual environments.

BACKGROUND

Interactive graphical environments can be useful in providing real or simulated interactions between individuals. Example graphic environments can include three-dimensional or simulated three-dimensional graphical displays, such as using a virtual reality (VR) headset, or three-dimensional environments rendered within a web browser.

Implementing interactive graphical environments, however, can be quite time consuming, and can require substantial technical knowledge. That is, while there may be tools to perform actions such as generating "avatars" representing various users, including animations for such users, a developer may still have to write code that includes logic for what avatars will be displayed, available avatar interactions, and actions to be taken when a particular interaction is selected by a user. Thus, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present disclosure provides techniques and solutions are provided for facilitating the definition and use of virtual environments. Typically, virtual environments require manual linking of virtual environment components, such as locations, avatars to be displayed, avatar interactions, and actions to be taken upon a selected interaction. This is in addition to actions to define, for example, a visual representation of a virtual location or an avatar. Disclosed techniques provide standardized data objects that can represent components of a virtual environment and relationships between such components. For example, aspects of a virtual environment can be predefined, and a user can configure the virtual environment with particular avatars and particular avatar content (such as media to be rendered for that avatar). In particular aspects, components of a virtual environment, such as avatars, can be determined at runtime, included based on attributes associated with a particular user for whom the virtual environment is to be rendered.

In one aspect, the present disclosure provides a process of defining a scene for a virtual environment. A first user interface screen is presented providing a first user interface control configured to receive first user input defining, at least in part, a scene of a virtual environment. A first identifier of one or more avatars to be included in the scene is received through the first user interface control. The first identifier is assigned to a first attribute of an instance of a data object of a data model comprising one or more data object types representing a virtual environment.

A second user interface screen is presented providing a second user interface control configured to receive second user input defining, at least in part, content associated with a first avatar of the one or more avatars included in the scene of the virtual environment, wherein the second user interface screen is the first user interface screen or is a user interface screen other than the first user interface screen. Content or an identifier of content to be associated with an avatar of the one or more avatars is received through the second user interface control. The content or the identifier of content is assigned to a second attribute of a data object type of the one or more data object types, where the second attribute is operationally linked to the first attribute.

The one or more instances of the one or more data object types include a third attribute defining an interaction for the first avatar and a fourth attribute defining an action to be executed upon triggering of the interaction of the first avatar, where the action is operationally linked to the second attribute.

In another aspect, the present disclosure provides a process of identifying avatars to be displayed in a virtual environment. A request to render a first virtual environment is received. The request includes a user identifier of a user for whom the first virtual environment is to be rendered. An instance of a first data object type is retrieved having a first attribute having the user identifier of the user. At least one value of a second attribute of the first data object type is retrieved. One or more avatars are identified of a set of one or more avatars represented as instances of a second data object type having a third attribute to which the at least one value is assigned. The second data object type is the first data object type or is a data object type other than the first data object type.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 7 is an example user interface screen that can be used by a user to define or configure an avatar.

DETAILED DESCRIPTION

Example 1—Overview

Figure 1:
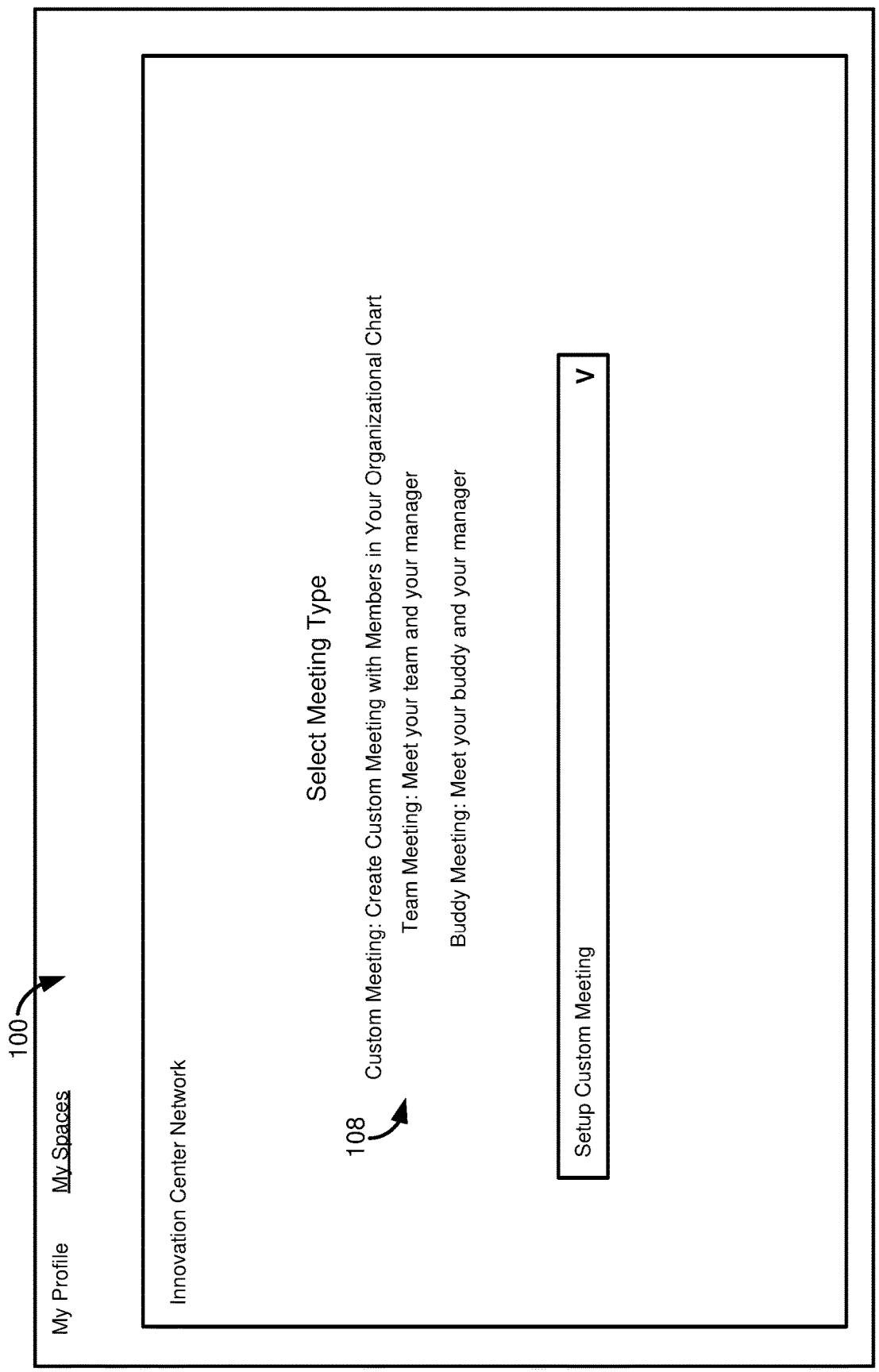
FIG. 1 illustrates an example user interface screen through which a user can select a virtual scenario to be rendered.

Interactive graphical environments can be useful in providing real or simulated interactions between individuals. Example graphic environments can include three-dimensional or simulated three-dimensional graphical displays, such as using a virtual reality (VR) headset, or three-dimensional environments rendered within a web browser.

Implementing interactive graphical environments, however, can be quite time consuming, and can require substantial technical knowledge. That is, while there may be tools to perform actions such as generating "avatars" representing various users, including animations for such users, a developer may still have to write code that includes logic for what avatars will be displayed, available avatar interactions, and actions to be taken when a particular interaction is selected by a user. Thus, room for improvement exists.

Disclosed embodiments provide processes, and associated computing objects, that can assist a user in developing interactive graphical environments (also referred to as "virtual environments"), including "templated" virtual environments. As an example, a particular "space" can represent a virtual location where interactions with one or more "characters" can take place. Described embodiments include "characters" that are "avatars"-interactive virtual representations of a particular user. An avatar can be generated that represents a particular individual, and various options for interacting with a given avatar (or avatars, generally) can be defined. New "scenes" in a space can then be rendered based on a particular avatar a user chooses to interact with, and a particular interaction option for the avatar selected by the user.

Consider a scenario where it is desired to create a virtual environment for an "employee onboarding" scenario, where a new employee can virtually meet various people with whom they may come into contact in their new working environment. A company have may have different locations where an employee can work, and a given employee may encounter different people based on their work location, as well as factors such as their job role. It can be cumbersome to create virtual environments for each possible permutation of each possible work role and each possible location.

Programming objects, such as classes or other instances of abstract or composite data types, can be defined to represent various elements of a virtual environment, as well as to process interactions between objects when an interactive graphical scenario is executed. These standard elements can be easily manipulated by end users to create or modify virtual environments.

In addition, at least some of these data types can be automatically configured or instantiated at runtime. For example, in the employee onboarding scenario, an identifier of the employee can be used to determine properties of the employee, such as a department in which they will be employed and a particular location in which they will be working. The department and avatar information can be used to dynamically configure a virtual environment, such as by populating the virtual environment with avatars or assets that are relevant to those parameters. A common underlying "template" for the virtual environment can be populated with different avatars or different assets for a different user based on their department and location.

The disclosed technologies can provide a number of benefits. For example, disclosed techniques can allow technical functionality to be made accessible to a greater variety of users, including users having less technical expertise than might be required to hardcode specific scenarios/interactive graphical environments, which can also reduce development time and coding requirements. Standardizing how interactive graphical environments are defined can also improve interoperability between different applications or computing systems used to create or execute virtual environments. The use of configurable virtual environment templates can allow for multiple virtual environments to be generated dynamically, rather than a user needing to "hardcode" individual scenarios.

Example 2—Example Selection and Rendering of Virtual Environment

Although the disclosed technologies are not limited to a specific use case, the disclosed technologies will be described with respect to a particular use case to help facilitate an understanding of the technologies, generally. The specific example involves the onboarding process for a new employee. Starting a new job can be stressful for an employee, as so it can be helpful, for example, to introduce the employee "virtually" to members of their employer, such as company executives, an individual to whom the employee will primarily report, individuals of a team of which the employee may be a member, and a "buddy" or "mentor" who might be assigned to help the employee adjust to their new position. Thus, when the employee meets their colleagues in real life, they may have a greater comfort level, and may already know something about the individuals they will work with even being exposed to someone's face/appearance and their voice can help real life interactions be less stressful.

FIG. 1 illustrates an example user interface screen 100 that can be presented to a user who wishes to start an interaction with a particular virtual environment. The user interface screen 100 displays a number of different meeting types 108. For the employee onboarding example, meeting types can include those having avatars for members of an employee's team and a team manager, those with avatars for an employee's mentor/buddy and the employee's manager, or a custom meeting that can be defined by the employee, such as where the employee can select particular people to virtually meet from a company organization chart.

As has been described, information about a particular employee can be used to select the appropriate avatars for a meeting type. Thus, a template for a "buddy meeting" can be defined, but where the avatar for the "buddy" is dynamically (and automatically) selected or configured based on information about the employee who requests the meeting.

As will be further described, the various types of meetings selectable by the user can be based on common components of a virtual environment, or can have different components. For example, a meeting may be associated with a virtual location, such as an office, a conference room, or a break room, and the location can be the same for the different meeting types, or can be different. Even when a common location is used, a different meeting type can affect what avatars are rendered in a particular environment. Different avatars may have different available types of interactions, and the nature of the avatars can affect a virtual experience, regardless of the location. In particular examples, a location can optionally be used to define what types of interactions are available. For example, an avatar may have some interactions that are always available, some interactions that are only available in the office location, and some interactions that are only available if the location is a break room.

Meeting types can also affect what actions a user may perform in a virtual environment, and what responses are generated for a given action. Assume both a team meeting and a buddy meeting occur in a same virtual location and include the same avatars for a given user. A user may be presented with different dialog options for the same avatar for different meeting types. Or, even if the same dialog option is present, the response provided can differ depending on the meeting type.

Figure 2:
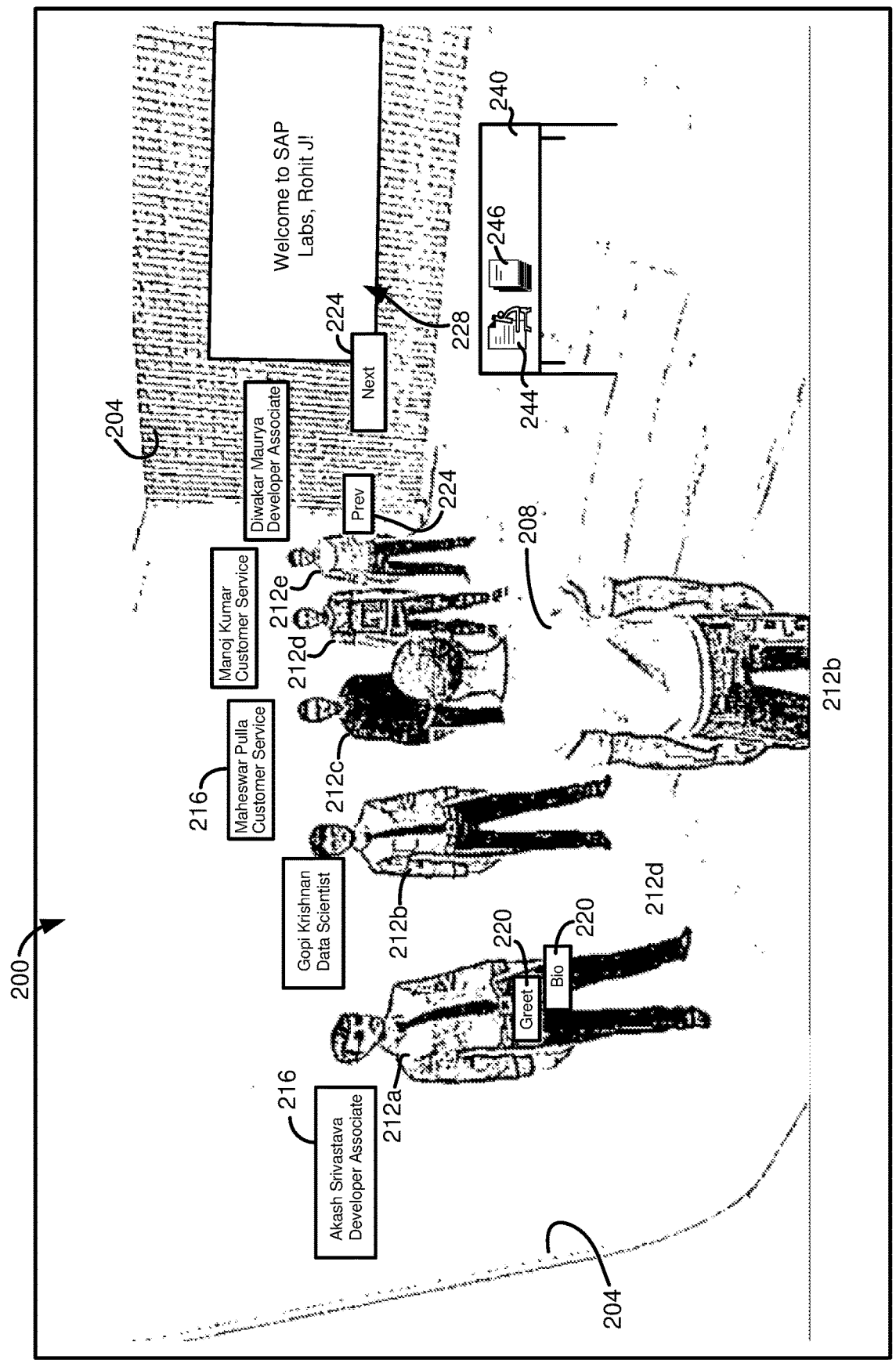
FIG. 2 illustrates an example display of a virtual environment, including illustrating interactions available to a user.

FIG. 2 illustrates an example graphical display of a virtual environment 200. The virtual environment 200 can include a rendering of a particular virtual location, such as a conference room or an office. Some of the graphical assets used in rendering the virtual environment 200, such as the location, can be "standard" assets that have properties that can be the same, or at least similar, regardless of a scenario (such as an instance of a virtual environment "template" that is configured at runtime for a particular employee) in which the assets are used. For example, walls 204 can have properties that restrict movement of other assets in the virtual environment 200, such as an avatar 208 for a user or avatars 212 (shown as 212a-212e) for other real-time users or for "non-player characters."

A non-player character refers to an avatar that is not directly controlled by a user. In a particular example, a non-player character is associated with one or more available actions, where a scripted response is triggered in response to an action. Some actions or properties of a non-player character avatar can be configurable for specific scenarios, while other actions may be standardized, or at least represent default actions or properties. For example, an avatar (including a user avatar) can be associated with predefined graphical routines to simulate movement of an avatar. Customized movements can be assigned to an avatar, but standard animations may also be available. It can be desirable to provide customized dialog options for particular non-player character avatars.

In the example virtual environment 200, the non-player character avatars 212 are shown with graphical "labels" 216 providing a user with information about an individual represented by such an avatar. In the "employee onboarding" scenario, this information can include a name of an individual represented by an avatar 212 and their position within the company. The virtual environment 200 can also display dialog options 220. The avatar 212a is shown as including a dialog option 220 for requesting a greeting by the individual represented by the avatar or a biography of that individual.

In some cases, the virtual environment 200 can display options for interacting with components of the virtual environment, including displaying "navigation options" 224. The navigation options 224 shown in the virtual environment 200 include an option to move the focus of the user avatar 208 to a next non-player character avatar 212 or to a previous non-player character avatar. As the focus shifts between the non-player character avatar 212, the dialog options 220 can change, or the dialog options can remain the same, but content specific to an "active" non-player character avatar 212 is rendered upon selection of a dialog option 220.

Other assets of the virtual environment 200 can be customized for a specific scenario. For example, the virtual environment 200 illustrates a display board 228, which displays a message ("Welcome to SAP Labs") that can be standard content for a particular scenario, and other content that is customized based on the particular user avatar 208 that interacts with the virtual environment, such as by displaying a user's name along with the standard message.

The virtual environment 200 can have assets in addition to the non-player character avatars 212 with which a user can interact through the user avatar 208. For example, the virtual environment 200 includes a desk 240, where graphical elements 244 and 246 are displayed on the desk. The graphical elements 244, 246 can be selected by a user, such as to display content to a user, where the content can be standard content, custom content, or a combination thereof. Selection of the graphical element 244 can, for example, be selected and result in a display of information about a company, such as an employee handbook, an employee directory, or other information. Selection of the graphical element 246 can, for example, bring up information about a user associated with the user avatar 208, such as personal information for the employee (name, address), a current job description, or payroll or human resources information, which can include forms that the user is requested to complete as part of an onboarding process.

Note that the implementation of the user environment 200 can vary from the above description. For example, rather the having navigation options 224, a user may be able to guide their avatar 208 through the virtual environment 204, where a user selection or user focus can be used to present a user with interaction options. Rather than using the navigation options 224, the user may be able to select a non-player character avatar 212 to interact with by placing their user avatar 208 in closer proximity to a desired non-player character avatar. Similarly, the dialog options 220 or the labels 216 can be displayed based on proximity of the user avatar 208 to a non-player character avatar 212.

Example 3—First Example Virtual Environment Data Model

Figure 3:
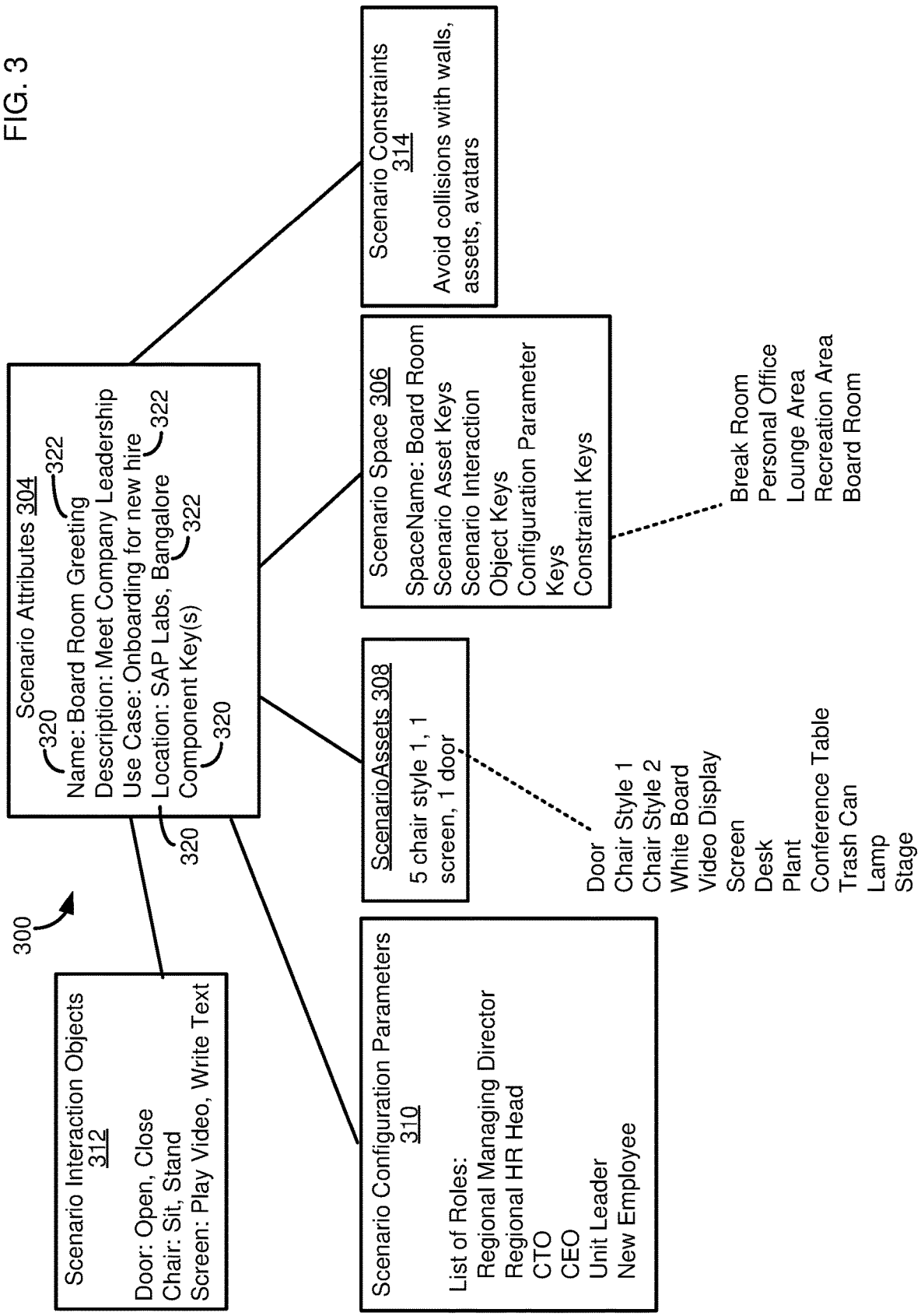
FIGS. 3-5 illustrate example data models and data objects that can be used to implement disclosed technologies.

Virtual environments can be formed from a variety of object types, where an object can be a computing object, such as an abstract or composite datatype, and where instances of such datatypes can be created to store information for a particular scenario/template. In some cases, objects can be implemented as relational database tables, and where at least some attributes of the tables can be linked to particular audio or visual assets (such as using a file name or file path). A particular generalized data model 300 for maintaining information about a virtual environment scenario is shown in FIG. 3.

The data model 300 has a number of data model objects 304, 306, 308, 310, 312, 314. Some data objects 304-314 can be independent of other data objects, while other data objects can be defined with respect to other data objects.

Consider what elements might be needed for a virtual environment, which can be associated with a scenario attributes object 304 that represents the overall scenario associated with the virtual environment. The scenario might take place in one or more locations, or spaces, represented by a scenario space data model object 306. A variety of assets may be available for inclusion in a space, and the assets can be specified in a scenario assets data model object 308.

In some cases, user or non-player characters can be included in the assets data model object. In other cases, it may be desirable to specify scenario configuration parameters in a data model object 310, such as defining particular roles for a scenario, and where avatars can be included based on information about who may currently be in a particular role. In addition, the role can be associated with attributes categorizing the role, such as a location attribute or a department attribute.

In an implementation, if it is desired to include a unit leader in a virtual scenario, the avatar for a particular unit leader could be defined in an instance of the scenario assets data model object 308. However, a particular individual having that role can change over time. Specifying a particular role in an instance of the data model object 310 can help reduce the need to modify a scenario over time, since when the scenario represented by the virtual environment is executed, a current individual having a particular role can be identified, and their avatar and associated information used for that execution of the scenario.

A scenario interaction objects data model object 312 can define actions that are available for assets in the virtual environment, or for user or non-player character avatars.

A scenario constraints data model object 314 can define any constraints on components of a scenario. For example, a constraint can be that particular assets are moveable or non-moveable, or that collisions should not be allowed between particular assets. In some cases, at least some of these can be constraints can be included in a definition of an asset, and when an asset is instantiated, a particular constraint can be defined as activate or not active. As an example, an asset for a chair could be activated such that the chair is moveable through use action or collision with another asset, or that the chair is immoveable, where movement of other assets into a space in which the chair is present can be handled accordingly (for example, a user avatar is prevented from entering the space occupied by a chair, similar to a collision with a wall).

In a particular implementation, a scenario can be defined using an instance of the scenario attributes data model object 304. That is, the scenario attributes data model object 304 is shown as having data members 320, where values 322 assigned to the data members are for a specific instance of the scenario attributes data model object. In this case, the data members 320 provide attributes for a name of the scenario, a description of the scenario, a use case for the scenario, a location for the scenario, and optionally one or more keys for various components of the scenario.

In particular, the keys attribute can be used to link a particular instance of the scenario attributes data model object 304 to specific instances of one or more of the data model objects 306-314. Keys can be used to specify what space or spaces are associated with a scenario (for example, if an action is provided to move from one space to another space), what assets are associated with a given instance of a particular space, what roles/avatars are available for a given space, what interactions are available for the assets/avatars, and any constraints on the scenario.

In some cases, a scenario, such as defined by an instance of the scenario attributes data model object 304, is not directly linked to instances of all of the data model object types 306-314. An instance of the scenario attributes data model object 304 can specify one or more instances of a scenario space object 306.

FIG. 3 illustrates the instance of the scenario space data model object 306 as having a plurality of attributes, including a name for the instance. There can be one or more predefined spaces, where a space can be associated with particular graphical or audio characteristics, such as being linked with a content file (such as in the FBX format, available from AUTODESK, or WEBGL, available from the KHRONOS GROUP INC.). In the example of FIG. 2, the content file can be processed to render the room of the virtual environment 204.

Although the instance of the scenario attributes data model object 304 references the instance of the space scenario data model object 306, the space scenario data model object instance can specify content that is to be included in the space, such as by specifying keys for particular instances of the scenario assets data model object 308. Maintaining scenario components as separate data model objects can help facilitate component reuse, as well as assisting non-technical users in building virtual environment scenarios.

For example, the same scenario space instance can be used with multiple virtual environments. Similarly, the same scenario space instance can be used in a variety of ways by customizing an instance with specific assets desired to be included in the space-one instance of a "boardroom" space can include three chairs and a table, while another instance of a "boardroom" can include six chairs, a table, and a video screen simply by including the appropriate asset identifiers in the definition of the scenario space instance.

In a similar manner, an instance of the scenario space data object can reference instances of the scenario interaction data model object 312, instances of the configuration parameters data model object 310, or instances of the scenario constraints data model object 314.

Various data model objects 304-314 may be defined with respect to additional data objects. For example, an instance of the scenario space data model object 306 can specify a particular space, where FIG. 3 illustrates a variety of available, defined spaces, such as a break room, a personal office, a lounge area, a recreation area, or the board room, which was selected for the particular illustrative instance of the scenario space data model object. These spaces can be instances of a "space" data object, which will be further described with respect to FIG. 4.

In a similar manner, the scenario assets data model object 308 is shown in FIG. 3 as having a variety of different asset types, such as different types of chairs that can be included in a space, tables, plants, doors, etc. In turn, these various asset types can be represented as instances of an asset object type, again as discussed in conjunction with FIG. 4. The scenario configuration parameters, scenario interaction, and scenario constraint data model objects 310-314 can similarly be associated with respective object types.

Figure 4:
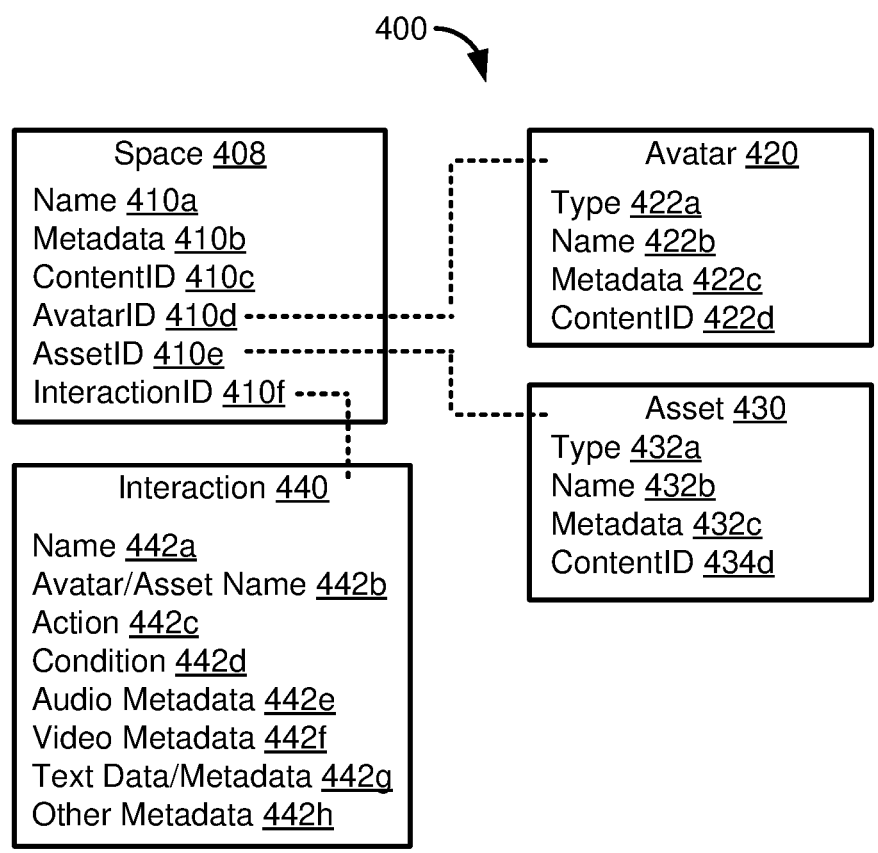

FIG. 4 illustrates example data objects in a data model 400 that can be used with the data model objects 304-314 of FIG. 3. A space data object 408 can define a particular location that can be used in a virtual environment. For example, an instance of the space data object 408 can be used to define the boardroom space discussed in conjunction with FIG. 3. An instance of the space data object 408 can have a name attribute 410a (such as "boardroom"), and can be associated with one or more metadata attributes 410b. An example of a metadata attribute 410b can be an attribute that stores a description of the space, or specifies restrictions on the use of the space.

For example, the space may represent a real-world location, and a location identifier can be included as a metadata attribute 410*b*, where a value of the location identifier can be used to restrict use of the space to scenarios for which the space is relevant. For example, there can be multiple instances of the space data object 408 that represent a boardroom, but one boardroom may be for a boardroom at a Bangalore, India location, while another boardroom may be for a Walldorf, Germany location. If a user in Bangalore is creating a virtual environment, they may be associated with a location identifier value, and may be restricted to using spaces having the same location identifier value.

In another embodiment, a user for which a virtual environment is to be rendered may be associated with a location identifier, and that location identifier may be used to select the correct "boardroom" instance of the space data object 408. A user defining a scenario can simply specify "boardroom" as a space to be included, create suitable representations of boardrooms for different locations, and programmatic logic can dynamically select the appropriate version of the boardroom to use in a virtual environment being rendered for a specific user.

The space data object 408 includes an attribute 410*c* that can be used to specify particular content associated with the space. A value of the attribute 410*c* can identify a particular file/file location for a file having appropriate audiovisual data, or can otherwise include information useable to identify such a file.

A value of an avatar identifier attribute 410*d* can be used to define what avatars are associated with a particular space. The avatar identifiers can be implemented in a variety of ways. In some cases, a value of the avatar identifier attribute can refer to a specific avatar, such as an avatar of a specific non-player character in a virtual environment. An avatar identifier can also refer to a specific avatar type, such as an avatar associated with a specific role. For example, a value of the avatar identifier attribute 410*d* can identify a particular development team, and avatars of non-player characters associated with that development team can be included in the instance of the space data object 408. Thus, while in some ways an instance of a space data object 408 can be considered as being statically defined, such as by identifying a particular role, in other ways the instance of the space data object can be considered as being dynamically defined, since the actual avatars to be rendered is determined at runtime.

Depending on how disclosed techniques are implemented, the space data object 408 can include additional/different attributes. For example, in some cases specific avatars, assets, or interactions can be defined for a specific instance of the space data object 408, such as by including suitable identifiers for instances of an avatar data object 420, an asset data object 430, or an interaction data object 440. Similarly, a value of the avatar attribute 410*d* corresponding to a particular user, for whom the virtual environment is being generated, can be supplied at runtime (such as in an argument to a function that instantiates an instance of the space data object 408, including by referring to a serialized/persisted version of a particular instance of a space data object that may contain defined values for other attributes 410 to be used in the instance of the space data object). More particularly, a call can have the form InstantiateSpaceDataObject (serializedInstanceIdentifier=1234, userID=currentUserID), where currentUserID is an identifier of a current user that can be used to retrieve the avatar of the current user, or is an identifier of the avatar of the current user.

The avatar object 420 can have various attributes 422. An attribute 422*a* can be used to indicate a type of avatar (such as whether the avatar is for a user or for a non-player character). A name of the avatar can be provided in an attribute 422*b*, where the name can be a name of an individual associated with the avatar, or can be a name of the avatar for a particular individual (that is, multiple avatars may be available for individuals, including a version of the avatar for a "formal" setting and a version of the avatar for "informal" settings).

The avatar object 420 can include one or more metadata attributes 422*c*, which in at least some cases can be implemented in a similar manner as the metadata attribute(s) 410*b*. The avatar object 420 can also include a content identifier attribute 422*d*, where a value of the content identifier attribute can be used to retrieve a particular file that can be used to render an avatar.

The asset data object 430 can include attributes 432*a*-432*d* that can be at least generally similar to the attributes 422*a*-424*d*. Note that it may be desirable to associate avatars and assets with a particular location in a particular virtual environment. In one example, the space object 408 can be modified to include one or more attributes that specify a location (or at least an initial location) in a particular space for a particular avatar or a particular asset.

The interaction object 440 can have an attribute 442*a* that provides a name for an interaction, and an attribute 442*b* can specify a particular avatar or asset to which the interaction applies. A name or type of action associated with the interaction 440 can be specified using an attribute 442*c*, while a condition that triggers the interaction can be specified in an attribute 442*d*. Examples of conditions can include actions such as "sit" or "stand" when the associated asset is a chair. Conditions can be defined for specific assets or avatars, or general types of conditions can be defined and can be made available for specific types of assets or for specific types or subsets of avatars, including having some conditions that are available for all assets or for all avatars.

Various types of audio or visual content can be associated with a particular instance of an interaction object 440, which can be identified (such as by file identifiers or file paths) using attributes 442*e*-442*g*, representing, respectively, audio, video, and textual content. As an example, upon triggering a particular instance of the interaction object 408 for a non-player character avatar, an animation for the avatar can be specified using a value of the attribute 442*f*, while an audio sound effect or audio content for the avatar can be indicated by a value for the attribute 442*e*.

Textual data or metadata identified by a value for the attribute 442*g* can be text to be rendered, or an identifier of text to be rendered. Rendering text can include visually displaying the text, but can also represent rendering the text as speech, including using a particular speech model that can be specified for a particular individual associated with a particular avatar. That is, an individual can train a model to emulate their voice, where simulated voice content can be generated by providing textual content to the model.

An attribute 442*h* for other types of metadata can, at least in some cases, be implemented in an analogous manner as the attribute 410*a*.

Example 4—Second and Third Example Virtual Environment Data Models

Figure 5:
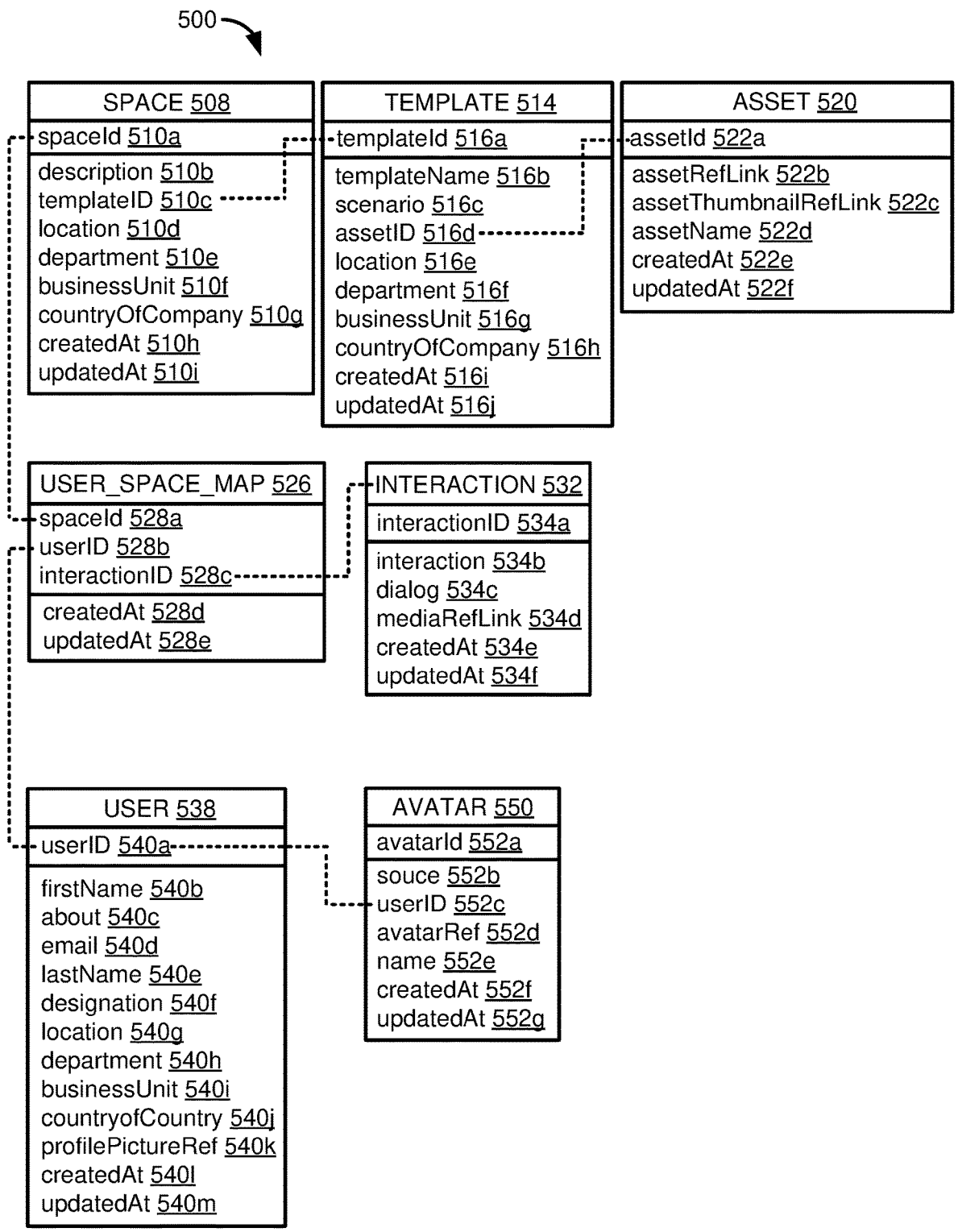

FIG. 5 provides another example data model, data model 500, that can be used to implement disclosed technologies.

A space data model object 508 includes a space identifier attribute 510*a* that serves as a primary key for the space data model object. The space data model object 508 can include additional attributes, such as a description 510*b*, a location 510*d*, a department 510*e*, a business unit 510*f*, and a country 510*g* associated with a particular company. That is, the attributes 510*d*-510*g* can represent attributes used in the employee onboarding example scenario.

Although not shown in FIG. 5, the attributes 510*d*-510*g* can be used to customize a particular virtual environment scenario. For example, a location, such as a particular city in which a company facility is located, can be used with attribute 510*d* to determine assets that are used, or available for use in a virtual scenario. If Boston is set for a location, different avatars can be used, such as by selecting the avatar for a human resources lead for Boston, or using an asset for a conference room in Boston. If Bangalore is set for a location, the human resources lead for Bangalore can be selected, and an asset for a conference room in Bangalore can be retrieved.

Similar selection/filtering actions can occur in an analogous manner for the attributes 510*e*-510*g*. As another example, a value for the department attribute 510*e*, optionally including along with a value of the location attribute 520*d*, can be used to select particular avatars for use with a scenario, such as by retrieving an organization chart associated with the selected location and department.

The space data model object 508 can include metadata attributes that describe properties of an instance of the data object itself, such as an attribute 510*h* that provides a date the instance was created, and an attribute 510*i* that provides a date the instance was last updated.

The space data model object 508 also include a template identifier attribute 510*c* that can be used to link an instance of the space data model object with one or more instances of a template data model object 514. The template data model object 514 can generally reflect a collection of assets, which are in turn represented as instances of an asset data model object 520.

The template data model object 514 has a template identifier attribute 516*a* that serves as a primary key for the template data model object 514, and which is referenced by the attribute 512*c* of the space data model object 508. A given instance of the template data model object 514 can be associated with a particular scenario, indicated using a value for a scenario attribute 516*c*. In some cases, the same template identifier value can be associated with multiple scenarios (in which case, the primary key for the template identifier data model object 514 can optionally be defined to include both the template identifier attribute 516*a* and the scenario identifier attribute 516*c*). Values for the scenario identifier attribute 516*c* can be used to search for particular templates that are relevant to a particular scenario, including for creating associations between instances of the space data model object 508 and instances of the template identifier data model object 514.

As mentioned, a given instance of the template data model object 514 can be linked to one or more instances of the asset data model object 520, such as using an asset identifier attribute 516*d*, which can be a value of an asset identifier attribute 522*a* of the asset data model object, which serves as the primary key for the asset data model object. Thus, instances of the template data model object 514 can be used to "bundle" different assets together, such as bundling multiple assets with a common value for the template name attribute 514*b*. For example, instances of the space data model object 508 can be created for instances of the template data model object 514 having a particular value for the template name attribute 516*b*.

The template data model object 514 can have additional attributes 516*e*-516*j*, which can at least generally correspond to the attribute 510*d*-510*i*.

The asset data model object 520, in addition to the asset identifier attribute 522*a*, can have attributes 522*b*, 522*c* that, respectively, link a given instance of the asset data model object to a particular asset and a thumbnail of the asset, which can be used in various user interface displays to help a user select appropriate assets for a scenario. That is, instances of the asset data model object 520 can be used organize assets, but a particular audio or video asset represented as an instance of the asset data model object is not part of the instance, but rather it is retrieved using values of the attributes 522*b*, 522*c*. An asset name attribute 522*d* allows for more human-understandable names to be provided for a given instance of the asset data model object 520, including being used for search purposes (for example, a search for all assets that include "chair" as part of their name). Attributes 522*e* and 522*d* generally correspond to the attributes 510*h*, 510*i* of the space data model object 508.

A user space map data object 526 can be used to associate particular user identifiers, associated with a user data model object 538, with particular spaces (instances of the space data model object 508) and instances of an interaction data model object 532. For example, a particular user (in the example onboarding scenario, a non-player character) may have one or more interactions for each of one or more spaces. A given space may be associated with one or more users, and particular interactions of particular users can be used with particular spaces.

Accordingly, the user space map data model object 526 has attributes 528*a*, 528*b*, 528*c* that serve as the primary key for the user space map data model object, where the attribute 528*a* identifies a particular instance of the space data model object 508 (using a value of the attribute 510*a*), the attribute 528*b* identifies a particular instance of the user data model object 538 (by referencing an attribute 540*a*, serving as the primary key for the user data model object), and the attribute 528*c* identifies a particular instance of the interactions data model object 532 (by referencing an attribute 534*a*, serving as the primary key for the interactions data model object). The user space data model object 526 can include attributes 528*d*, 528*e*, which can be at least generally similar to the attributes 510*h*, 518*i*.

In addition to the interaction identifier attribute 534*a* that serves as the primary key for the interactions data model object 532, the interactions data model object can include an interaction attribute 534*b*, a dialog attribute 534*c*, and a media reference link attribute 534*d*. The interaction data model object 532 can also include attributes 534*e*, 534*f*, which can be at least generally similar to the attributes 510*h*, 510*i*.

Regarding the attributes 534*b*-534*d*, the interaction attribute 534*b* can provide a name or type for a particular interaction. The dialog attribute 534*c* can provide dialog, such as from a non-player character, when the interaction is triggered. In some cases, the dialog can be displayed as text, while in other cases the dialog can be rendered as speech, such as using a particular speech model for a particular user/non-player character.

The media reference attribute link 534*d* can be used in a variety of ways. In one way, the media reference attribute link 534*d* references a particular image or audio file associated with an interaction, including an audio or video file that corresponds to text associated with the dialog attribute 534*c*. In another example, the media reference attribute link 534*d* links to a particular speech rendering model for use with a value provided for the dialog attribute 534*c*.

An instance of the user data model object 538 can be used to describe particular non-player characters. In addition to the attribute 540*a* that serves as a primary key, the user data model object 538 can include various attributes 540*b*-540*j* that provide various information about a particular user. Attributes 540*b*, 540*e* provide first and last names for the user, while an attribute 540*d* provides an email address for a user. Attribute 540*c* can provide information about a particular user, which can be displayed to help with the selection of an appropriate user, or can be content that is displayed in association with the user when an avatar for the user is rendered in a virtual environment.

A designation, such as a job role or title, can be indicated using an attribute 540*f*. Attributes 540*g*-540*j* can be at least generally similar to the attributes 510*b*-510*f*, while an attribute 540*k* provides a link to a profile picture for the user, such as for use in generating user interface displays, including a user interface display that allows users to be selected for particular scenarios or components thereof. Attributes 540*l*, 540*m* can be at least generally similar to attributes 510*h*, 510*i*.

As has been described both "active" users, who interact with a virtual environment, and non-player characters, can be associated with avatars. An avatar data model object 550 can be used to associate particular users with particular avatars. The avatar data model object 550 has an avatar identifier attribute 552*a* that serves as the primary key for the avatar data model object. A source attribute 552*b* describes a source of the avatar, which can indicate a particular repository on which data implementing the avatar is located, or can represent a particular format used for the avatar. A user identifier attribute 552*c* serves to link instances of the avatar data model object 550 with instances of the user data model object 538, were values of the attribute 552*c* can correspond to values of the attribute 540*a*.

An avatar reference attribute 552*d* can provide a reference to avatar content, such as a file associated with information useable to render the avatar. For example, values of the avatar reference attribute 552*d* can be a path in a particular repository identified by a value of the source attribute 552*b*. Or, a value of the avatar reference attribute 552*d* can be an identifier that can be used to retrieve avatar content, such as an identifier of the avatar as used in a source system identifier through a value of the source attribute 552*b*. An attribute 552*e* can provide a name for the avatar, which can be a name of a particular user/non-player character, or can be used to distinguish between multiple avatars that might be available for a particular user, where the user can be an active user or can be represented as a non-player character. The avatar data model object 550 can include attributes 552*f*, 552*g*, which can be at least generally as described for the attributes 510*h*, 510*i*.

Example 5—Example Scene Transition Graphs

In general, a virtual environment is updated based on particular actions of a user who is interacting with the virtual environment. As described with respect to FIG. 2, for example, a user may be able to move their avatar 208 about the virtual environment 200, and then select to interact with one of the non-player character avatars 212. A state of the virtual environment 200 where no interactions have been made/are not currently active can be considered as one scene. Selection of a particular non-player character 212 can cause a transition to a new initial scene for that non-player character, where additional scenes for that non-player character may then be presented upon selection of an appropriate interaction by the user.

Other interactions can be implied/implicitly triggered by a user interaction. For example, dialog options 220 can be presented for different non-player characters 212 depending on the position of the user's avatar with respect to a particular avatar for a non-player character. Or, a user may more explicitly interact with the virtual environment 200, such as by shifting "focus" between different non-player characters 212 by selecting appropriate navigation options/controls 224.

Thus, scenes can be considered as interrelated, including where scenes can have an order or hierarchical relationships. For example, selection of a "bio" option for a non-player character may produce a scene with particular choices. However, those choices may not be displayed/available to a user until the user selects to interact with the non-player character using the bio choice/interaction.

Figure 6:
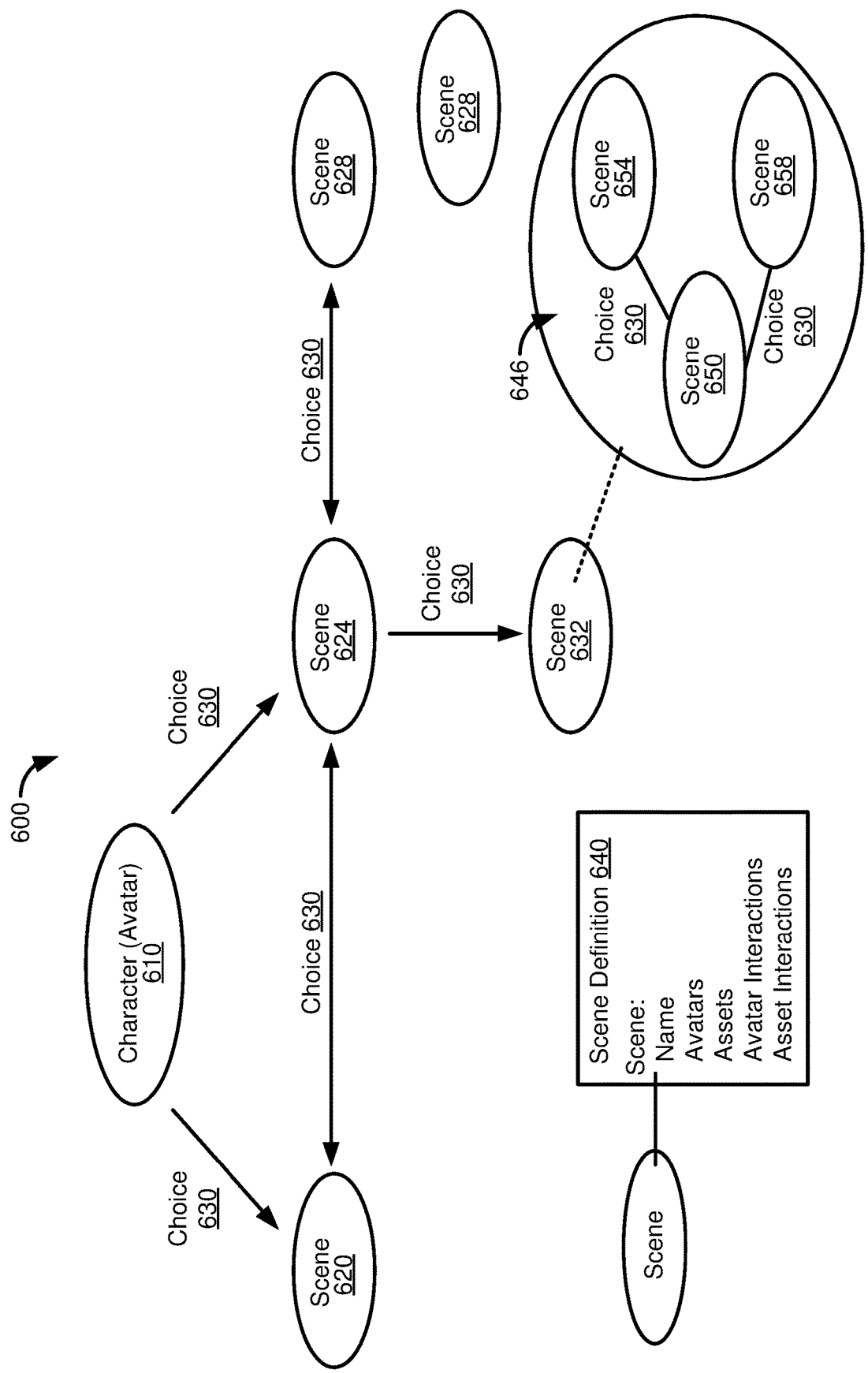
FIG. 6 illustrates example graphs that can be used to transition a virtual environment between different scenes based on interaction choices made by a user.

FIG. 6 illustrates a graph 600, which can be referred to as a character graph, that illustrates how a node 610 representing a user avatar can interact with nodes 620, 624, 628, 632 representing non-player character avatars. The node 610 can represent an initial scene where a choice has not yet been made/is not currently active. The node 610 can have properties associated with a scene definition 640, which can also represent properties of the nodes 620-632. The properties include a name of the scene, identifiers of one or more avatars defined for the scene, identifiers of one or more assets defined for the scene, one or more interactions that are available for scene avatars, and one or more interactions that are possible for scene assets (or more specifically, non-avatar assets).

The scenes associated with the nodes 610, 620, 624, 628, and 632, and the properties of the scene definition 640, can be correlated with objects in a data model, such as the data model 300 of FIG. 3, the data model 400 of FIG. 4, or the data model 500 of FIG. 5. In the case of the data model 300, the avatars can be provided by one or more instances of the scenario configuration parameters data model object 310, while the assets (for example, assets other than avatars) can be specified in one or more instances of the scenario assets data model object 308.

The avatar interactions and the asset interactions of the properties of the scene definition 640 can be represented as instances of the scenario interaction data model object 312. Assets, which can include avatar assets or non-avatar assets, can also be specified by one or more instances of the scenario space data model object 306, where at least some of the avatars or assets of the scene definition 640 can be obtained indirectly by reference to such instances. Similarly, avatars of the scene definition 640 can be indirectly obtained through one or more instances of the scenario space data model object 306, such as referring to one or more instances of the scenario configuration parameters data model object 310.

The avatar and asset properties of the scene definition 640 can correspond to instances of the avatar object 420 and the asset object 430 of FIG. 3, respectively. The avatar interactions and asset interaction properties of the scene definition 640 can correspond to instances of the interaction object 440. In some cases, the scene definition 640 can correspond to, or be represented as, an instance of the space object 408.

Referring to the data model 500, the asset and avatar properties of the scene definition can correspond to instances of the asset data model object 520 and the avatar data model object 550, respectively. The asset interactions and avatar interaction properties of the scene definition 640 can correspond to instances of the interaction object 532.

A user can select to interact with one or more of the scenes, at least those that are available for selection, such as by taking appropriate actions with their avatar 610. In general, the user can transition between scenes by making choices 630. As shown, the user can initially make a choice 630 that triggers scene 620 or a choice that triggers scene 624. The user has choices 630 that allow for transitions between scenes 620, 624. Scenes 628 and 632 are only available as choices 630 from scene 624, and so are not initially available to the user. While the user may transition between scenes 624 and 628, no further transitions are shown as being available from scene 632.

As a further example of how scenes can have an ordering, or can have a hierarchical relationship, scene 632 is shown as including a graph 646 of possible choices and scenes that are available once scene 632 has been triggered. The graph 646 can be referred to as a choice graph. In the particular "employee onboarding" example that has been described, including with respect to FIG. 2, the scene 632 can represent selection of a particular non-player character to interact with, which makes the character graph 646 active. Scene 650 can represent an initial scene that is presented when the user triggers scene 632, and the user can then make a choice 630 to trigger a scene 654 or a choice to trigger scene 658.

Figure 8A:
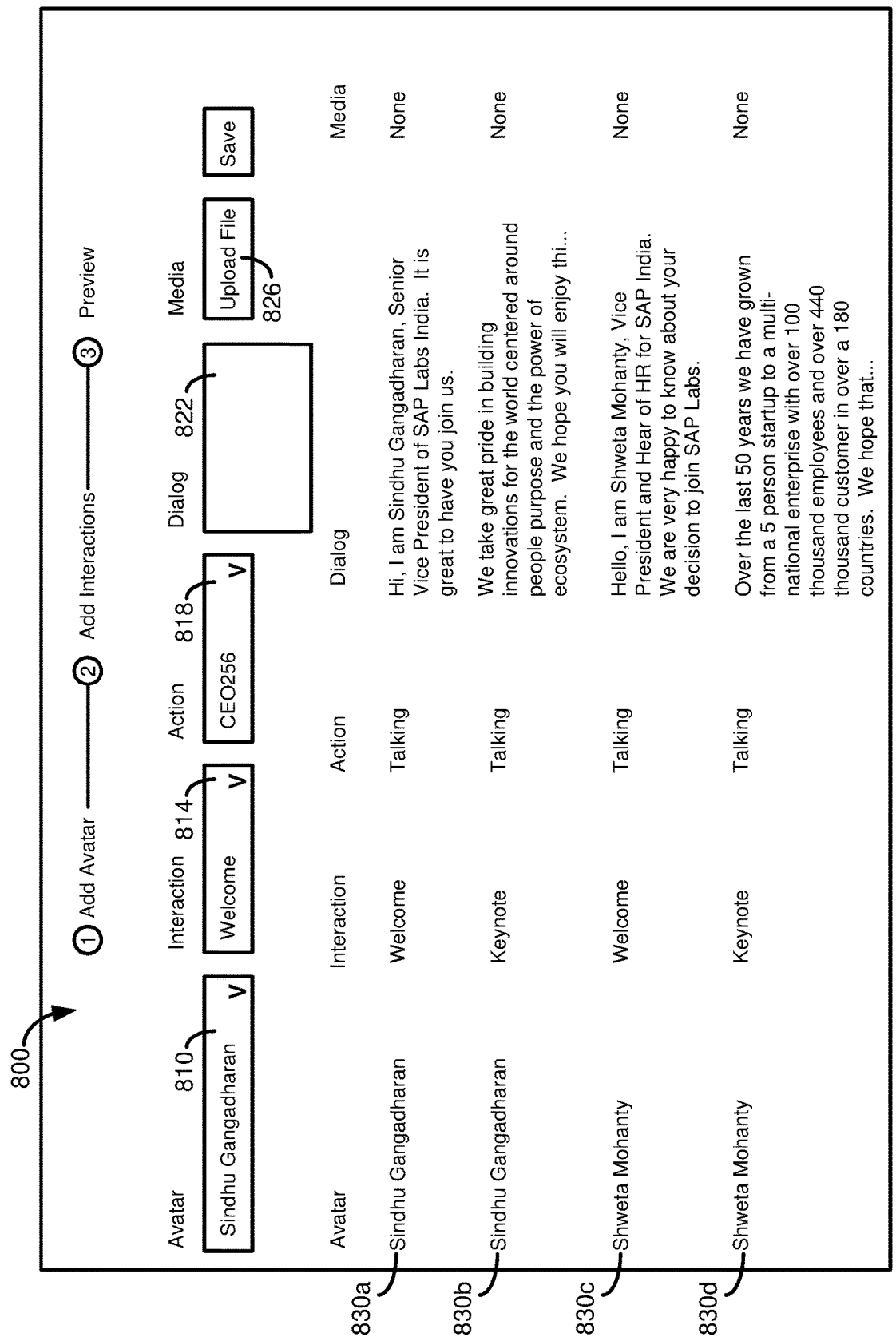
FIGS. 8A and 8B provide example user interface screens that can be used by a user to define scenes of a virtual environment, such as content to be rendered upon an action triggered by a particular interaction for a particular avatar used in a virtual environment.
Figure 8B:
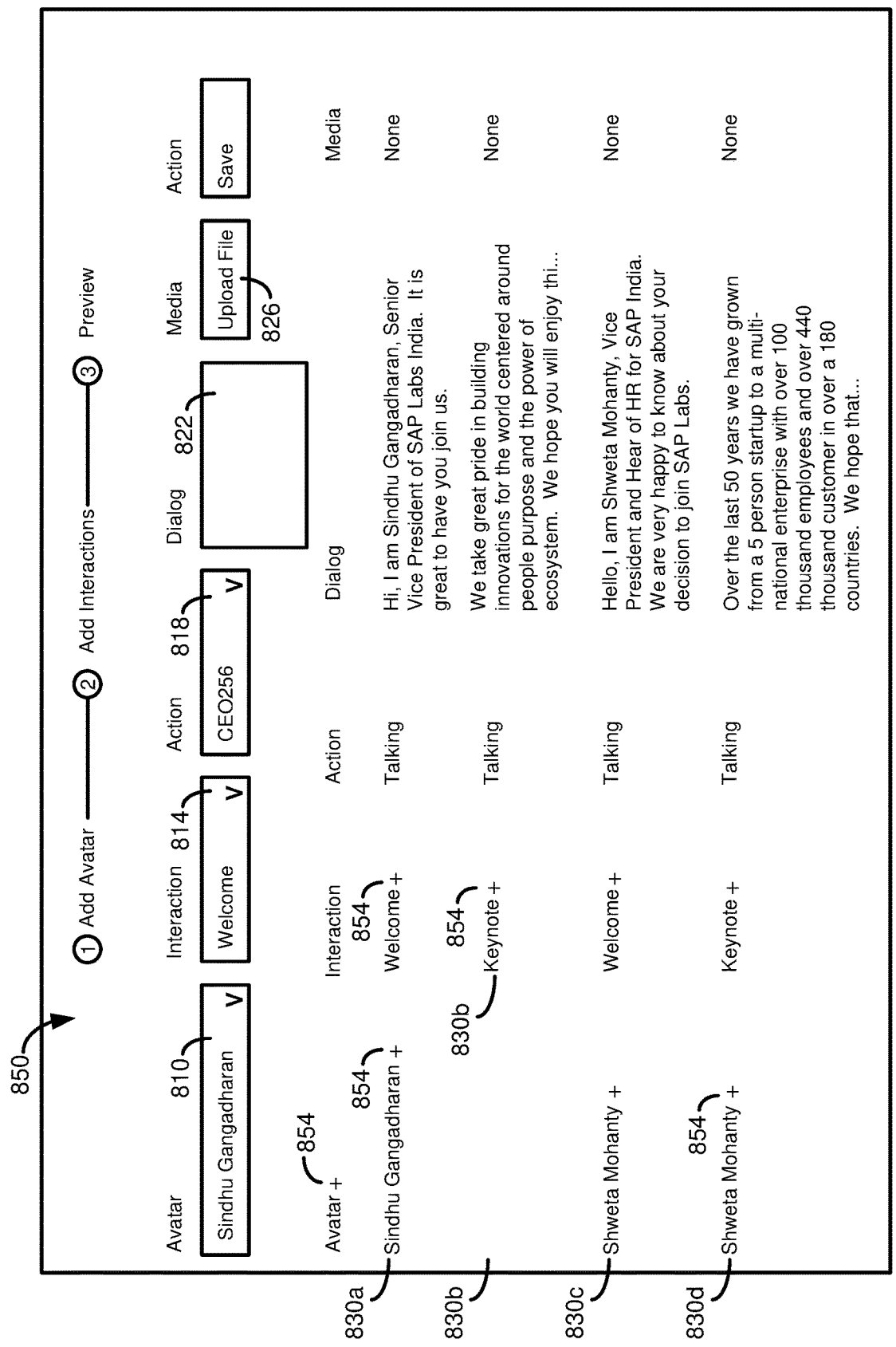
Figure 9:
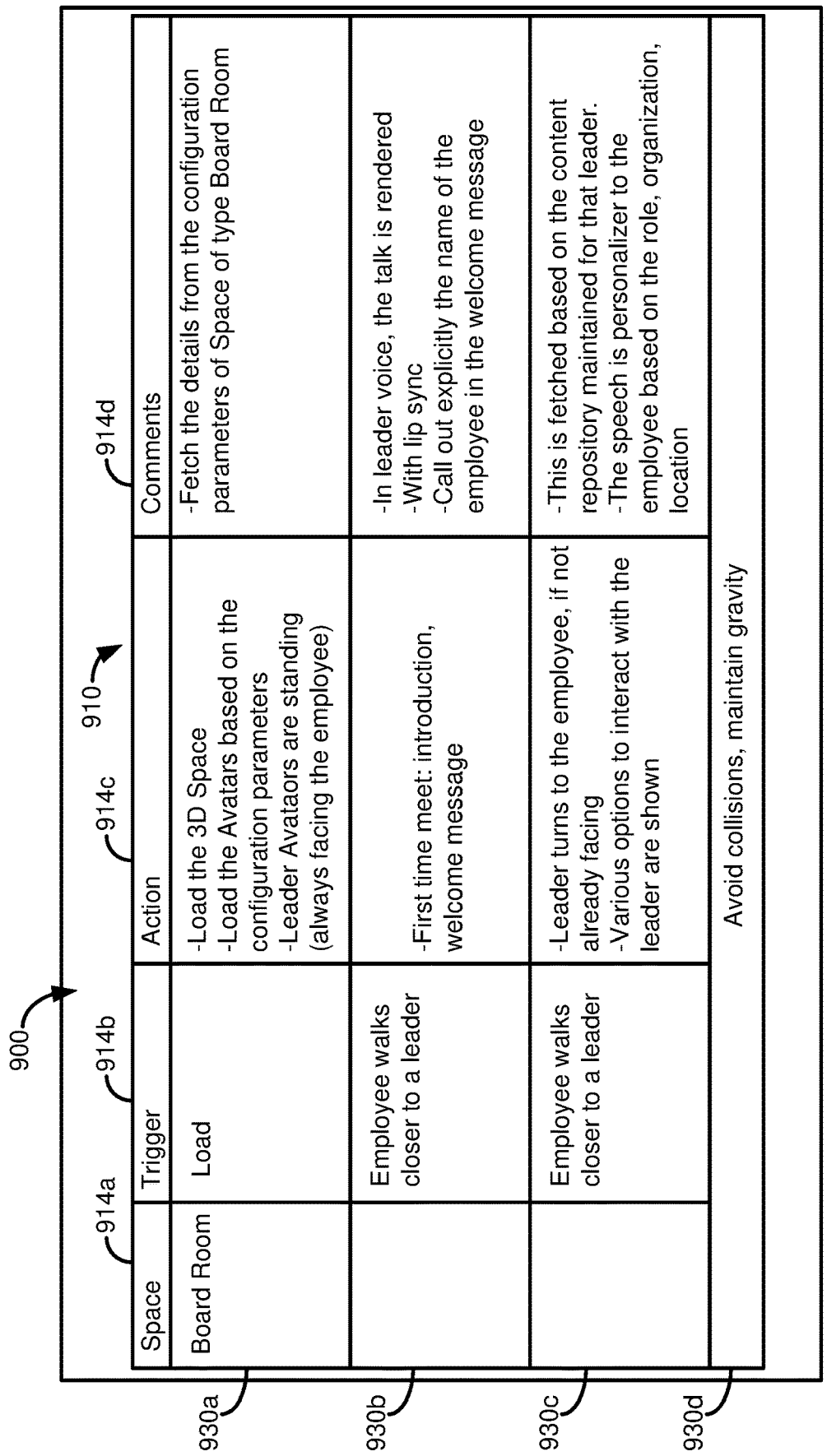
FIG. 9 presents another example user interface screen that can display information about various scenes defined for a virtual environment.

Example 6—Example User Interface Screens Useable in Defining a Virtual Environment FIGS. 7-9 represent various user interface screens that can be presented to users to facilitate the definition of virtual environments, or interaction within, virtual environments. FIG. 7 illustrates a user interface screen 700 that facilitates the creation of avatars. The avatars can be for users who are interacting with a virtual environment, for users who will be represented as non-player characters, or for both types of uses. The user interface screen 700 provides data entry fields 710 where a user can enter personal details, such as their name, job description, department, and work location.

The data entry fields 710 can also allow a user to enter information about themselves, such as biographical information. The biographical information can be used in the scenario of FIG. 2. Information provided through the data entry fields 710 can be stored in an instance of a data object, including as an instance of a data model object. More particularly, information from the data entry fields 710 can be stored in an instance of the avatar object 420 of FIG. 4 or as an instance of the user data model object 538 of FIG. 5.

A user may create different avatars for themselves using the interface screen 700. For example, selection of a control 720 can cause the creation of a new avatar, which can allow a user to provide video data (such as pictures or video files) that can be used to generate an avatar representation of the user. Creating an avatar can include defining particular actions that are available for the avatar, such as avatar movements that will be displayed upon a triggering event. FIG. 7, for example, shows interaction options 724 for a selected avatar, where a user can select one of the interaction options to be presented with a graphical preview of how the action will be represented in a virtual environment.

Although not shown in FIG. 7, a user interface screen 700 can include a control to generate a voice model for the user, which in at least some cases can be used with multiple avatars for the user, when multiple avatars are available. For example, a user may create different avatars with different "looks," but the same voice model can be used with those avatars.

FIG. 8A is an example user interface screen 800 that can facilitate a user that is developing a virtual environment to define scenes or transitions between scenes, such as the graph 600 or the graph 646 of FIG. 6. The user interface screen 800 include a control 810 that allows a user to specify a particular avatar that will be the subject of an interaction. The control 810 can be in the form of a dropdown menu, where available options can be those defined for a particular virtual environment, such according to the configuration parameters data model object 310 of FIG. 3, the space data object 408 of FIG. 4, or the space data model object 508 or the user space map data model object 526 of FIG. 5.

A user can specify a particular interaction with a selected avatar using a control 814. The control can list interactions that have been defined for a particular virtual environment or which are defined for the specific avatar selected using the control 610. The interactions can be associated with various data objects, such as instances of the interaction data object 440 or the interaction data model object 532 of FIG. 5. Note that, in the example of FIG. 5, instances of the interaction data model object 532 can be linked to particular instances of the avatar data model object 550, given that the user space map data model object 526 links to the interaction data object and to particular users represented as instances of the user data model object 538, where identifiers of those instances are then linked to particular avatars corresponding to instances of the avatar data model object.

An action corresponding to a particular interaction for a particular avatar, corresponding to selections made using the controls 810, 814, can be selected using a control 818. Actions can be implemented as shown for the interaction data object 440 of FIG. 4 (attribute 442c). In another example, the actions can be represented as dialog or media reference links as shown for the interaction data model object 532 of FIG. 5 (attributes 534c and 534d). When a dialog action is selected, text to be rendered (either displayed as text or converted to simulated speech) can be provided in a data entry field 822. Similarly, when media is to be rendered when a particular interaction is selected, appropriate media can be selected using a control 826. In some cases, both media and dialog can be selected for a particular interaction.

It can be seen how interactions 830a-830d that have been defined using the user interface screen 800 can correspond to the scenario illustrated in FIG. 2, as well as the graphs 600, 646 of FIG. 6. Initially, the interactions can represent choices 630 of the graphs 600, 646, where a new scene is rendered when the interaction is selected. That is, from a "current" scene selection of the "welcome" interaction 830a will transition to a new scene based on the "talking" action, where the content of the dialog associated with that interaction will be rendered.

FIG. 8B represents how scenes can be defined at having ordered or hierarchical arrangements. A user interface screen 850 of FIG. 8B is generally the same as described for the user interface screen 800 of FIG. 8A. However, in this case interaction 830b is shown as nested under interaction 830a. This can indicate that interaction 830b is only provided as an available interaction if a scene triggered by the interaction 830a is still "active." User interface controls 854 can be provided to indicate at what level of the hierarchy/what interaction a new interaction should be defined.

FIG. 9 provides a user interface screen 900 that illustrates how scenes can be defined for a virtual environment, including based on interactions defined using the user interface screen 800 of FIG. 8A or the user interface screen 850 of FIG. 8B. The user interface screen 900 provides a table 910. The table 910 has a column 914*a* identifying a particular space (such as a virtual location) in which the scenes take place and a column 914*b* that indicates a trigger (also referred to as an interaction) on which the scene will be activated. Column 914*c* lists one or more actions that are taken when a particular trigger of column 914*b* is detected. A column 914*d* can allow a user to describe the various scenes, such as how they relate to an overall virtual environment/use scenario, including how the scenes relate to one another.

Rows 930*a*-930*c* represent scenes, while row 930*d* represents particular constraints that are active for all of the scenes. Note that the scene of row 930*a* can be considered as a "default" scene, as it is triggered when the scenario is activated. The scenes of rows 930*b* and 930*c* are then triggered based upon particular actions of a user interacting with the virtual environment.

Example 7—Example Computing Environment

Figure 10:
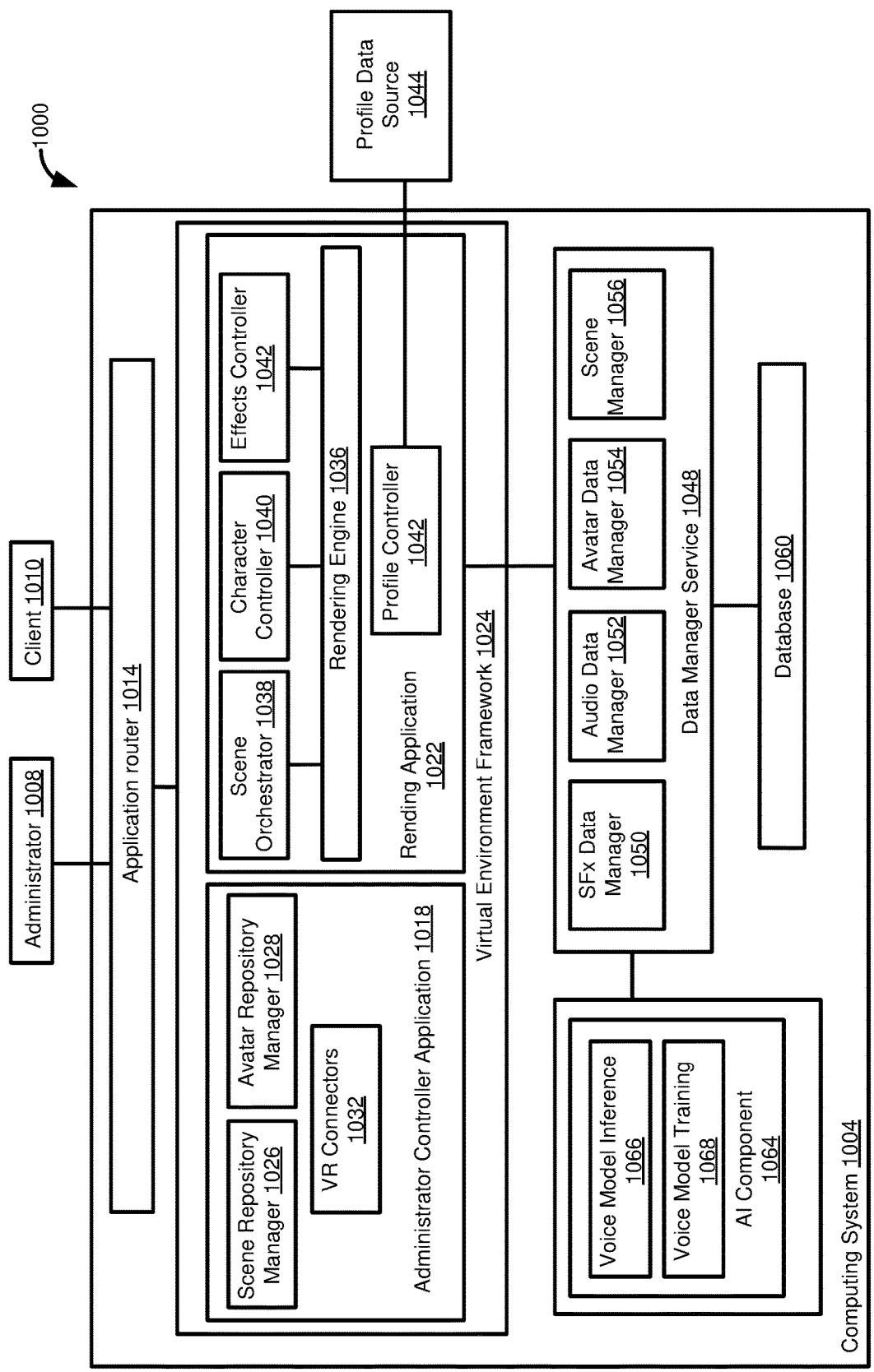
FIG. 10 is a diagram of an example computing environment in which disclosed techniques can be implemented.

FIG. 10 illustrates a computing environment 1000 in which disclosed technologies can be implemented. Generally, the computing environment 1000 illustrates a computing system 1004 with which various users, such as an administrator 1008 or a client 1010, can interact. The computing system 1004 can include an application router 1014. Virtual environments of disclosed techniques can be implemented using one or more applications, and the application router 1014 can route requests to define/update a virtual environment, such as from the administrator 1008, or to interact with a virtual environment, such as from the client 1010, to the appropriate application.

As shown, the computing system 1004 includes administrator controller application 1018 and a rendering application 1022, that can be part of a virtual environment framework 1024. The administrator controller application 1018 can include a scene repository manager 1026 and an avatar repository manager 1028. The scene repository manager 1026 can facilitate operations for defining and modifying scenes, such as by providing particular computing methods that can be called by the administrator 1008. The methods can be used to create or modify instances of the data objects associated with the data model 300 of FIG. 3, the data model 400 of FIG. 4, or the data model 500 of FIG. 5. The avatar repository manager 1028 can offer similar methods for creating and modifying avatars.

Disclosed techniques can leverage existing technologies for the creation of audio or video content. Accordingly, the administrator controller application 1018 can include one or more VR connectors 1032. For example, a VR connector 1032 can be used to access an external service for creating a content file representing a space, an asset, or an avatar.

The rendering application 1022, in particular examples, can be an application that uses the WEBGL format (available from the KHRONOS GROUP INC.). Example applications include BABYLONJS, UNITY WEBGL (Unity Technologies), and UNREAL WEBGL (Epic Games, Inc.).

The rendering application 1022 can include a rendering engine 1036, where the rendering engine can perform operations such as rendering avatars and assets, including updating a display based on user actions in a virtual environment. The rendering application 1022 can further include a scene orchestrator 1038, which can provide/identify information to be rendered to the rendering engine 1036, such as defining locations that should be displayed, as well as avatars, and assets, including as previously described. The scene orchestrator 1038 can also define interactions that cause the rendering engine 1036 to make changes to a rendered virtual environment.

The rendering application 1022 can include a character controller 1040, which can accept user input interacting with a virtual environment, where such input can cause a change in a rendered virtual environment, including when input satisfies an interaction/trigger definition (which can be provided by the scene orchestrator 1038). An effects controller 1042 of the rendering application 1022 can cause various effects, such as sound effects or video effects, to be rendered, such as when triggered by user interaction with a virtual environment.

The rendering application 1022 can include a profile controller 1042, which can be used, for example, to obtain information about a user avatar to be rendered by the rendering engine 1036. The profile controller 1042 may optionally be used to retrieve other information, such as for users that will be represented as non-player characters. As described, in some cases non-player characters can be specified with respect to criteria such as a role or a location. The profile controller 1042 can determine particular users that should be included in a scenario, and rendered using the rendering engine 1036. In the example employee onboarding scenario, information about a user may identify a department and location for the user, which can then be used by the profile controller 1042 to identify what individuals satisfy the criteria and to obtain relevant information for them, such as their avatars. At least in some implementations, the profile controller 1042 can obtain information from an external data source, shown as a profile data source 1044. In the case of the employee onboarding example, the profile data source can be a human resources computing system (or data associated therewith).

The computing system 1004 can further include a data manager service 1048 In a particular example, the data manager service 1048 can be used to create, read, update, and delete data/data objects implementing aspects of a virtual environment, including data objects of the data models 300, 400, 500 of FIGS. 3-5. The data manager service 1048 can include a sound effects data manager 1050, such to manage data associated with sounds/audio content to be played in conjunction with one or more scenes of a virtual environment. For example, the sound effects data manager 1050 can be used to specify sounds that will be played depending on a user action or activity-such as a "walking" sound effect if user input is provided to navigate their avatar within a virtual environment. An audio data manager 1052 can perform similar functions, but with more "specific" audio content, such as an audio file to be rendered with a user selects a particular dialog interaction for a particular non-player character avatar.

Information about avatars, including user avatars or non-player character avatars can be maintained using an avatar data manager 1054. For example, the avatar data manager 1054 can process create, read, update, or delete operations for an avatar, including during an avatar creating/editing process as described in conjunction with the user interface screen 700 of FIG. 7. A scene manager 1056 can facilitate the definition of scenes and associated content, such as assets, avatars, and interactions.

The data manager service 1048, including its components, can communicate with a database 1060. The database 1060 can store information associated with a virtual environment, such in data objects corresponding to a data model 300, 400, 500 of FIGS. 3-5.

The data manager service 1048 can also communicate with an artificial intelligence component 1064. As discussed, machine learning techniques can be used to create voice emulation models for particular users. The artificial intelligence component 1064 can include a voice training component 1068, where samples of a user's voice can be provided to train a machine learning model. The artificial intelligence component 1064 can include an inference component 1066. In an example, text can be provided to the inference component 1066, and the inference component can return audio data that simulates a user speaking the provided textual content.

Example 9—Example Operations

Figure 11A:
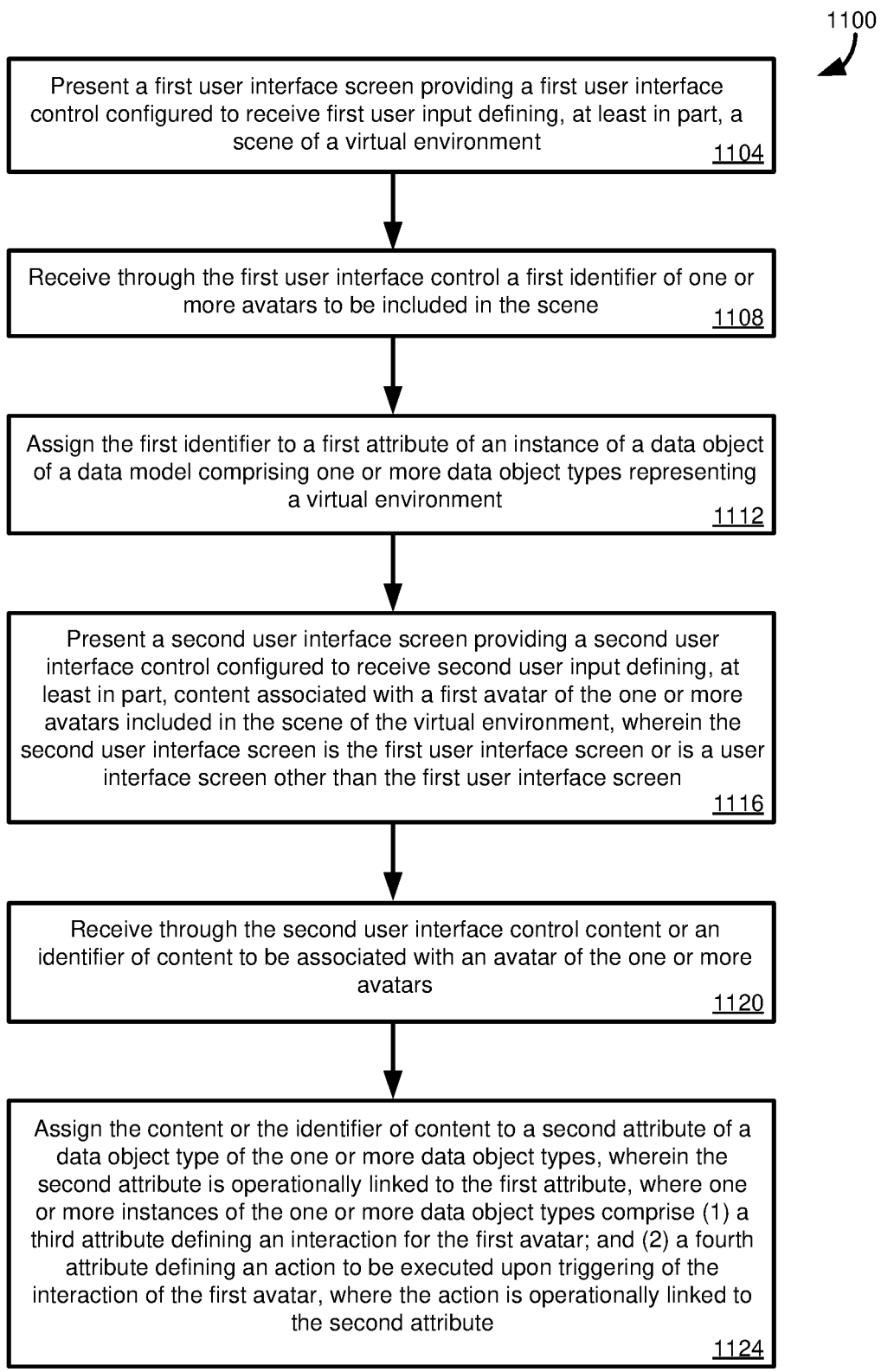
FIG. 11A is a flowchart of a process of defining a scene for a virtual environment.

FIG. 11A is a flowchart of a process 1100 of defining a scene for a virtual environment. At 1104, a first user interface screen is presented providing a first user interface control configured to receive first user input defining, at least in part, a scene of a virtual environment. A first identifier of one or more avatars to be included in the scene is received through the first user interface control at 1108. The first identifier is assigned at 1112 to a first attribute of an instance of a data object of a data model comprising one or more data object types representing a virtual environment.

At 1116, a second user interface screen is presented providing a second user interface control configured to receive second user input defining, at least in part, content associated with a first avatar of the one or more avatars included in the scene of the virtual environment, wherein the second user interface screen is the first user interface screen or is a user interface screen other than the first user interface screen. Content or an identifier of content to be associated with an avatar of the one or more avatars is received through the second user interface control at 1120. The content or the identifier of content is assigned at 1124 to a second attribute of a data object type of the one or more data object types, where the second attribute is operationally linked to the first attribute.

The one or more instances of the one or more data object types include a third attribute defining an interaction for the first avatar and a fourth attribute defining an action to be executed upon triggering of the interaction of the first avatar, where the action is operationally linked to the second attribute.

Figure 11B:
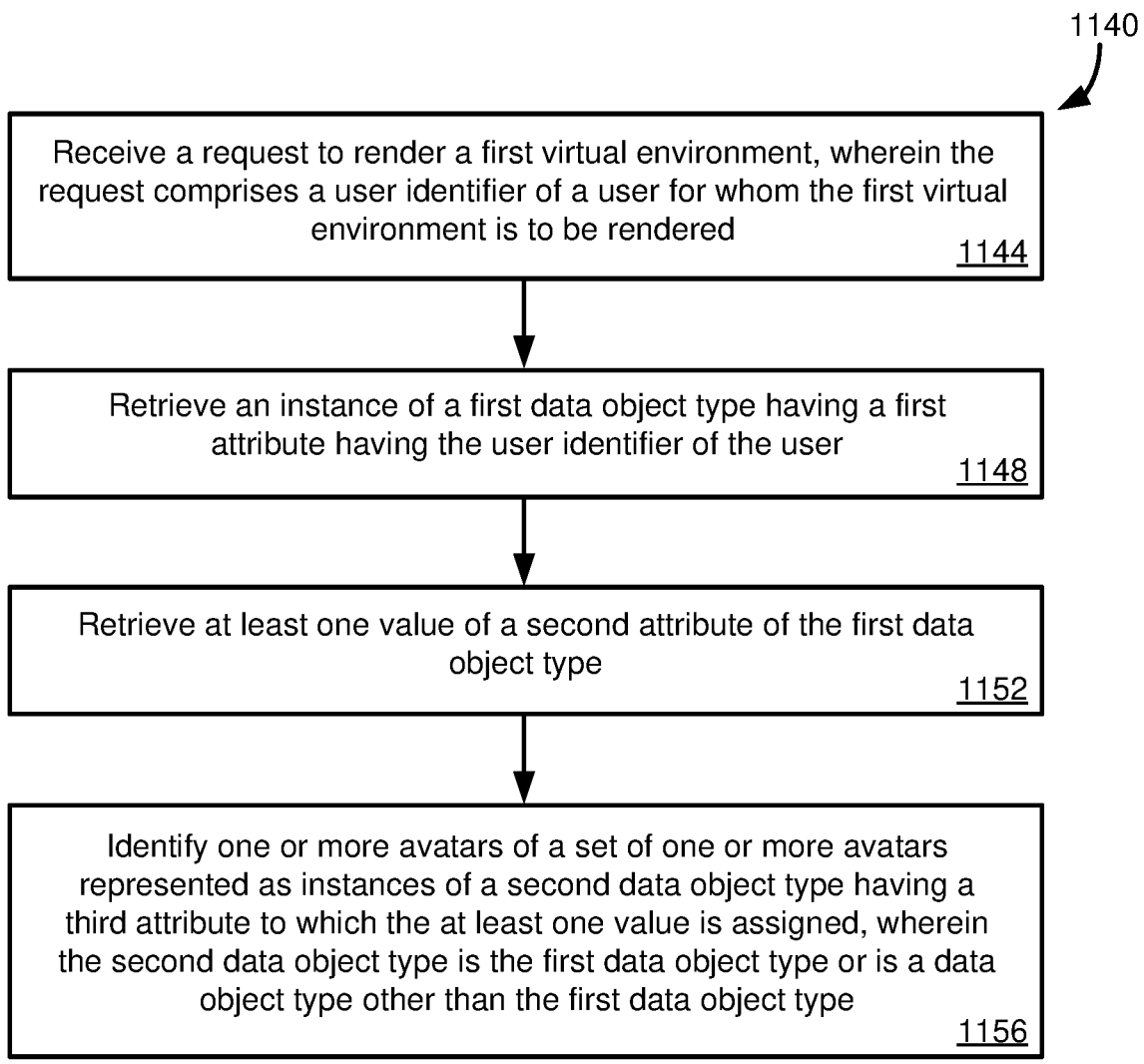
FIG. 11B is a flowchart of a process of identifying avatars to be displayed in a virtual environment.

FIG. 11B presents a flowchart of a process 1140 of identifying avatars to be displayed in a virtual environment. A request to render a first virtual environment is received at 1144. The request includes a user identifier of a user for whom the first virtual environment is to be rendered. At 1148, an instance of a first data object type is retrieved having a first attribute having the user identifier of the user. At least one value of a second attribute of the first data object type is retrieved at 1152. One or more avatars are identified at 1156 of a set of one or more avatars represented as instances of a second data object type having a third attribute to which the at least one value is assigned. The second data object type is the first data object type or is a data object type other than the first data object type.

Example 10—Computing Systems

Figure 12:
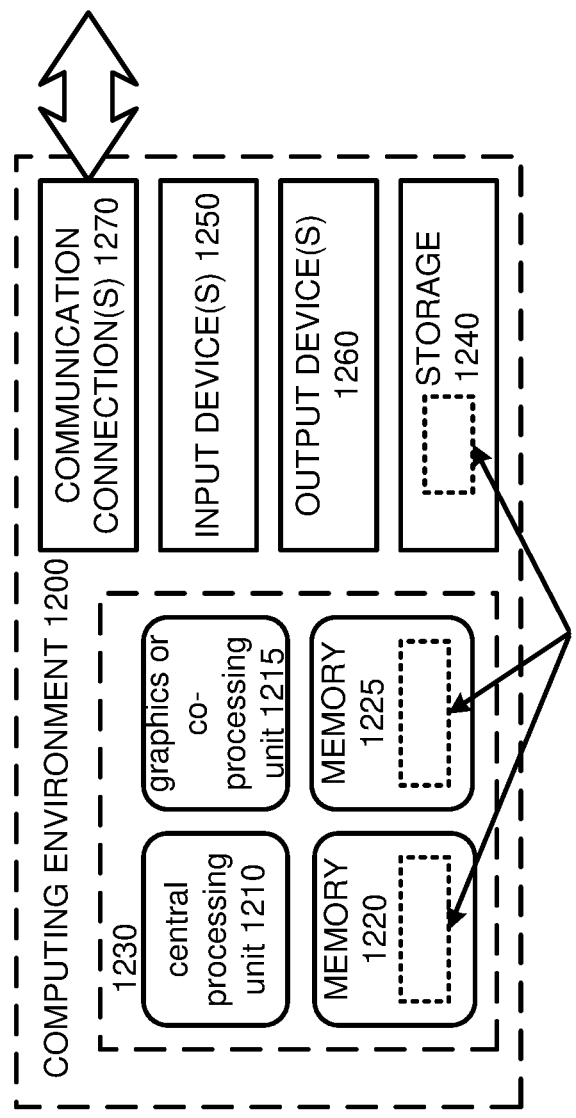
FIG. 12 is a diagram of an example computing system in which some described embodiments can be implemented.

FIG. 12 depicts a generalized example of a suitable computing system 1200 in which the described innovations may be implemented. The computing system 1200 is not intended to suggest any limitation as to scope of use or functionality of the present disclosure, as the innovations may be implemented in diverse general-purpose or special-purpose computing systems.

With reference to FIG. 12, the computing system 1200 includes one or more processing units 1210, 1215 and memory 1220, 1225. In FIG. 12, this basic configuration 1230 is included within a dashed line. The processing units 1210, 1215 execute computer-executable instructions, such as for implementing components of the processes of the present disclosure. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 12 shows a central processing unit 1210 as well as a graphics processing unit or co-processing unit 1215. The tangible memory 1220, 1225 may be volatile memory (e.g., registers, cache, RAM), non-volatile memory (e.g., ROM, EEPROM, flash memory, etc.), or some combination of the two, accessible by the processing unit(s) 1210, 1215. The memory 1220, 1225 stores software 1280 implementing one or more innovations described herein, in the form of computer-executable instructions suitable for execution by the processing unit(s) 1210, 1215. The memory 1220, 1225, may also store settings or settings characteristics, databases, data sets, interfaces, displays, object instances, or model.

A computing system 1200 may have additional features. For example, the computing system 1200 includes storage 1240, one or more input devices 1250, one or more output devices 1260, and one or more communication connections 1270. An interconnection mechanism (not shown) such as a bus, controller, or network interconnects the components of the computing system 1200. Typically, operating system software (not shown) provides an operating environment for other software executing in the computing system 1200, and coordinates activities of the components of the computing system 1200.

The tangible storage 1240 may be removable or non-removable, and includes magnetic disks, magnetic tapes or cassettes, CD-ROMs, DVDs, or any other medium which can be used to store information in a non-transitory way, and which can be accessed within the computing system 1200. The storage 1240 stores instructions for the software 1280 implementing one or more innovations described herein.

The input device(s) 1250 may be a touch input device such as a keyboard, mouse, pen, or trackball, a voice input device, a scanning device, or another device that provides input to the computing system 1200. The output device(s) 1260 may be a display, printer, speaker, CD-writer, or another device that provides output from the computing system 1200.

The communication connection(s) 1270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 11—Cloud Computing Environment

Figure 13:
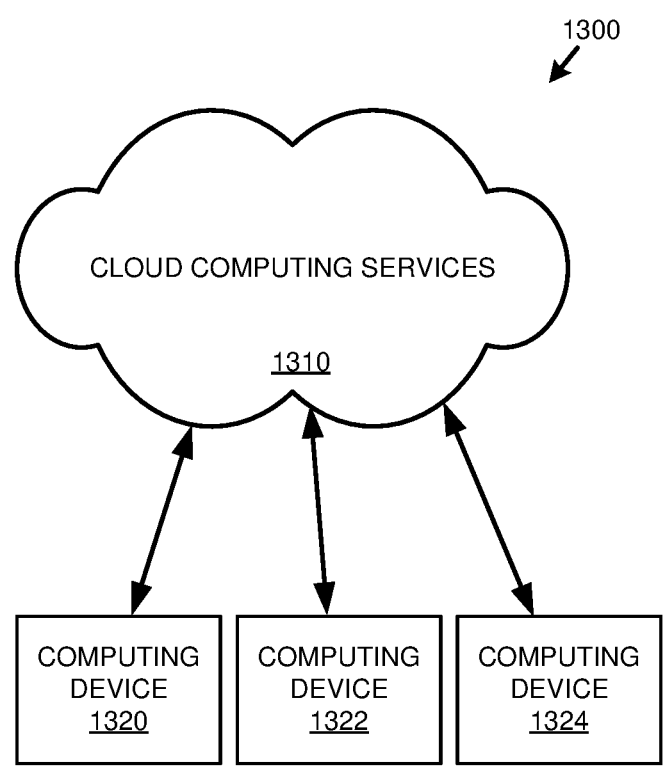
FIG. 13 is an example cloud computing environment that can be used in conjunction with the technologies described herein.

FIG. 13 depicts an example cloud computing environment 1300 in which the described technologies can be implemented. The cloud computing environment 1300 comprises cloud computing services 1310. The cloud computing services 1310 can comprise various types of cloud computing resources, such as computer servers, data storage repositories, networking resources, etc. The cloud computing services 1310 can be centrally located (e.g., provided by a data center of a business or organization) or distributed (e.g., provided by various computing resources located at different locations, such as different data centers and/or located in different cities or countries).

The cloud computing services 1310 are utilized by various types of computing devices (e.g., client computing devices), such as computing devices 1320, 1322, and 1324. For example, the computing devices (e.g., 1320, 1322, and 1324) can be computers (e.g., desktop or laptop computers), mobile devices (e.g., tablet computers or smart phones), or other types of computing devices. For example, the computing devices (e.g., 1320, 1322, and 1324) can utilize the cloud computing services 1310 to perform computing operations (e.g., data processing, data storage, and the like).

Example 12—Implementations

Although the operations of some of the disclosed methods are described in a particular, sequential order for convenient presentation, it should be understood that this manner of description encompasses rearrangement, unless a particular ordering is required by specific language set forth. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 12, computer-readable storage media include memory 1220 and 1225, and storage 1240. The term computer-readable storage media does not include signals and carrier waves. In addition, the term computer-readable storage media does not include communication connections (e.g., 1270).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   at least one hardware processor;
   at least one memory coupled to the at least one hardware processor; and
   one or more computer-readable storage media storing computer-executable instructions that, when executed, cause the computing system to perform operations comprising:
      presenting a first user interface screen providing a first user interface control configured to receive first user input defining, at least in part, a scene of a virtual environment;
      receiving through the first user interface control a first identifier of one or more avatars to be included in the scene;
      assigning the first identifier to a first attribute of an instance of a data object of a data model comprising one or more data object types representing a virtual environment;
      presenting a second user interface screen providing a second user interface control configured to receive second user input defining, at least in part, content associated with a first avatar of the one or more avatars included in the scene of the virtual environment, wherein the second user interface screen is the first user interface screen or is a user interface screen other than the first user interface screen;
      receiving through the second user interface control content or an identifier of content to be associated with an avatar of the one or more avatars;
      assigning the content or the identifier of content to a second attribute of a data object type of the one or more data object types, wherein the second attribute is operationally linked to the first attribute;
      wherein one or more instances of the one or more data object types comprise:
         (1) a third attribute defining an interaction for the first avatar; and
         (2) a fourth attribute defining an action to be executed upon triggering of the interaction of the first avatar, wherein the action is operationally linked to the second attribute.

2. The computing system of claim 1, wherein the first identifier identifies a particular avatar associated with a particular user.

3. The computing system of claim 1, wherein the first identifier identifies a user role and the operations further comprise:
   selecting avatars of a set of avatars having the user role as the one or more avatars.

4. The computing system of claim 3, wherein the selecting avatars occurs during runtime upon a request to execute the virtual environment by a user and the user role is determined from information associated with the user.

5. The computing system of claim 3, wherein the first user input is associated with a location, and the avatars of the set of avatars are restricted to avatars that are operationally linked with the location.

6. The computing system of claim 1, wherein the first identifier identifies a user for whom the virtual environment will be rendered, the user is associated with an instance of a data object type of the one or more data object types, and the one or more avatars are selected as those having a common value for at least one attribute of the data object type.

7. The computing system of claim 1, wherein the content comprises text content and the operations further comprising:
   submitting the text content to a voice emulation model defined for the first avatar.

8. The computing system of claim 1, the operations further comprising:
   presenting a third user interface screen providing a third user interface control configured to receive third user input defining, at least in part, a value to be assigned to the third attribute, wherein the third user interface screen in the first user interface screen, is the second user interface screen, or is a user interface screen other than the first user interface screen.

9. The computing system of claim 8, wherein the third user interface control is operationally linked to a plurality of attribute values selectable using the third user interface control.

10. The computing system of claim 1, the operations further comprising:
    presenting a third user interface screen providing a third user interface control configured to receive third user input defining, at least in part, a value to be assigned to the fourth attribute, wherein the third user interface screen is the first user interface screen, is the second user interface screen, or is a user interface screen other than the first user interface screen.

11. The computing system of claim 10, wherein the third user interface control is operationally linked to a plurality of attribute values selectable using the third user interface control.

12. The computing system of claim 1, wherein the first user interface control is operationally linked to a plurality of attribute values selectable using the first user interface control.

13. The computing system of claim 1, the operations further comprising:
    presenting a third user interface screen providing a plurality of user interface controls for defining the avatar, the plurality of user interface controls comprising a third user interface control for defining or identifying a visual representation of the avatar.

14. One or more non-transitory computer-readable storage media comprising:
    computer-executable instructions that, when executed by a computing system comprising at least one hardware processor and at least one memory coupled to the at least one hardware processor, cause the computing system to present a first user interface screen providing a first user interface control configured to receive first user input defining, at least in part, a scene of a virtual environment;

computer-executable instructions that, when executed by the computing system, cause the computing system to receive through the first user interface control a first identifier of one or more avatars to be included in the scene;

computer-executable instructions that, when executed by the computing system, cause the computing system to assign the first identifier to a first attribute of an instance of a data object of a data model comprising one or more data object types representing a virtual environment;

computer-executable instructions that, when executed by the computing system, cause the computing system to present a second user interface screen providing a second user interface control configured to receive second user input defining, at least in part, content associated with a first avatar of the one or more avatars included in the scene of the virtual environment, wherein the second user interface screen is the first user interface screen or is a user interface screen other than the first user interface screen;

computer-executable instructions that, when executed by the computing system, cause the computing system to receive through the second user interface control content or an identifier of content to be associated with an avatar of the one or more avatars; and computer-executable instructions that, when executed by the computing system, cause the computing system to assign the content or the identifier of content to a second attribute of a data object type of the one or more data object types, wherein the second attribute is operationally linked to the first attribute;

wherein one or more instances of the one or more data object types comprise:
(1) a third attribute defining an interaction for the first avatar; and
(2) a fourth attribute defining an action to be executed upon triggering of the interaction of the first avatar, wherein the action is operationally linked to the second attribute.

15. The one or more non-transitory computer-readable media of claim 14, wherein the first identifier identifies a user role or a location, further comprising:
computer-executable instructions that, when executed by the computing system, cause the computing system to select avatars of a set of avatars having the user role or the location as the one or more avatars.

16. A method, implemented in a computing system comprising at least one hardware processor and at least one memory coupled to the at least one hardware processor, the method comprising:

presenting a first user interface screen providing a first user interface control configured to receive first user input defining, at least in part, a scene of a virtual environment;

receiving through the first user interface control a first identifier of one or more avatars to be included in the scene;

assigning the first identifier to a first attribute of an instance of a data object of a data model comprising one or more data object types representing a virtual environment;

presenting a second user interface screen providing a second user interface control configured to receive second user input defining, at least in part, content associated with a first avatar of the one or more avatars included in the scene of the virtual environment, wherein the second user interface screen is the first user interface screen or is a user interface screen other than the first user interface screen;

receiving through the second user interface control content or an identifier of content to be associated with an avatar of the one or more avatars;

assigning the content or the identifier of content to a second attribute of a data object type of the one or more data object types, wherein the second attribute is operationally linked to the first attribute;

wherein one or more instances of the one or more data object types comprise:
(1) a third attribute defining an interaction for the first avatar; and
(2) a fourth attribute defining an action to be executed upon triggering of the interaction of the first avatar, wherein the action is operationally linked to the second attribute.

17. The method of claim 16, wherein the first identifier identifies a user role, further comprising:
selecting avatars of a set of avatars having the user role as the one or more avatars.

18. The method of claim 17, wherein the selecting avatars occurs during runtime upon a request to execute the virtual environment by a user and the user role is determined from information associated with the user.

19. The method of claim 17, wherein the first user input is associated with a location, and the avatars of the set of avatars are restricted to avatars that are operationally linked with the location.

20. The method of claim 16, wherein the first identifier identifies a user for whom the virtual environment will be rendered, the user is associated with an instance of a data object type of the one or more data object types, and the one or more avatars are selected as those having a common value for at least one attribute of the data object type.

* * * * *